US009302700B2

(12) United States Patent
Yoshida et al.

(10) Patent No.: US 9,302,700 B2
(45) Date of Patent: *Apr. 5, 2016

(54) TORQUE SENSOR AND POWER STEERING SYSTEM USING THE TORQUE SENSOR

(71) Applicant: HITACHI AUTOMOTIVE SYSTEMS STEERING, LTD., Hiki-gun, Saitama (JP)

(72) Inventors: Osamu Yoshida, Yokohama (JP); Tatsuyoshi Maruyama, Atsugi (JP); Kiyotaka Shirakubo, Ayase (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 442 days.

This patent is subject to a terminal disclaimer.

(21) Appl. No.: 13/851,585

(22) Filed: Mar. 27, 2013

(65) Prior Publication Data

US 2014/0076655 A1     Mar. 20, 2014

(30) Foreign Application Priority Data

Sep. 14, 2012   (JP) ................................. 2012-202208

(51) Int. Cl.
   *G01B 7/04*     (2006.01)
   *B62D 5/04*     (2006.01)
   (Continued)

(52) U.S. Cl.
   CPC ............... *B62D 5/0463* (2013.01); *B62D 6/10* (2013.01); *G01L 3/101* (2013.01); *G01L 3/102* (2013.01); *G01L 5/221* (2013.01)

(58) Field of Classification Search
   CPC .......... G01B 7/04; B62D 5/0463; B62D 6/10; G01L 3/101; G01L 5/221; G01L 3/102
   USPC ........ 324/207.2, 207.24, 207.25; 73/862.325, 73/332, 333, 335; 180/444, 446
   See application file for complete search history.

(56) References Cited

U.S. PATENT DOCUMENTS 5,585,573 A * 12/1996 Satoh ....................... B62D 6/10
                                                        73/862.331
6,912,923 B2    7/2005 Froehlich et al.
(Continued)

FOREIGN PATENT DOCUMENTS

| JP | 2004-309463 A | 11/2004 |
| JP | 2008-180518 A | 8/2008 |
| JP | 2011-080870 A | 4/2011 |

OTHER PUBLICATIONS

U.S. Appl. No. 13/851,568, filed Mar. 27, 2013, Hitachi Automotive Systems Steering, Ltd.
(Continued)

*Primary Examiner* — Huy Q Phan
*Assistant Examiner* — Lamarr Brown
(74) *Attorney, Agent, or Firm* — Foley & Lardner LLP

(57) ABSTRACT

Torque sensor has: magnetic member; first yoke member having (a) first nail portions arranged concentrically to face the magnetic member in radial direction and (b) first ring portion; second yoke member having (c) second nail portions arranged concentrically so that the first and second nail portions are circumferentially alternately arranged and the second nail portions face the magnetic member in radial direction and (d) second ring portion; first magnetic flux concentration ring provided between the first and second ring portions; second magnetic flux concentration ring provided between the second ring portion and the first magnetic flux concentration ring; and magnetic sensor. The first and second magnetic flux concentration rings and the first and second ring portions are arranged in layers in radial direction. A part or all of axial direction area of the first and second magnetic flux concentration rings is surrounded and shielded by the second ring portion.

20 Claims, 12 Drawing Sheets

(51) Int. Cl.
   *G01L 3/10*   (2006.01)
   *B62D 6/10*   (2006.01)
   *G01L 5/22*   (2006.01)

(56) References Cited

U.S. PATENT DOCUMENTS

| | | | | |
|---|---|---|---|---|
| 6,948,384 | B2 * | 9/2005 | Bossoli | G01L 3/102 |
| | | | | 73/862.333 |
| 6,959,612 | B2 | 11/2005 | May | |
| 7,406,884 | B2 * | 8/2008 | Jerems et al. | 73/862.331 |
| 7,415,898 | B2 * | 8/2008 | Ishihara et al. | 73/862.331 |
| 7,562,590 | B2 * | 7/2009 | Tokumoto et al. | 73/862.331 |
| 7,987,734 | B2 * | 8/2011 | Maehara | 73/862.333 |
| 8,087,306 | B2 * | 1/2012 | Goll et al. | 73/862.335 |
| 8,393,230 | B2 * | 3/2013 | Jeon et al. | 73/862.193 |
| 8,607,649 | B2 * | 12/2013 | Matsumoto | 73/862.333 |
| 8,806,962 | B2 * | 8/2014 | Shidahara et al. | 73/862.325 |
| 9,004,221 | B2 * | 4/2015 | Yoshida et al. | 180/444 |
| 2002/0060105 | A1 | 5/2002 | Tominaga et al. | |
| 2002/0108454 | A1 * | 8/2002 | Nakano | B62D 6/10 |
| | | | | 73/862.333 |
| 2004/0031332 | A1 | 2/2004 | May | |
| 2004/0112146 | A1 * | 6/2004 | Islam | G01L 3/109 |
| | | | | 73/862.331 |
| 2004/0194560 | A1 | 10/2004 | Froehlich et al. | |
| 2005/0211001 | A1 * | 9/2005 | Sugiyama | B62D 6/10 |
| | | | | 73/862.08 |
| 2007/0007950 | A1 * | 1/2007 | Goto | B62D 6/10 |
| | | | | 324/207.15 |
| 2008/0092671 | A1 * | 4/2008 | Maehara | G01L 3/104 |
| | | | | 73/862.331 |
| 2010/0084215 | A1 | 4/2010 | Sakatani et al. | |
| 2011/0167928 | A1 * | 7/2011 | Maehara | B62D 6/10 |
| | | | | 73/862.325 |
| 2013/0152703 | A1 * | 6/2013 | Arimura | G01L 3/102 |
| | | | | 73/862.333 |
| 2013/0337958 | A1 * | 12/2013 | Scalf | H02K 11/0042 |
| | | | | 475/149 |
| 2014/0076655 | A1 | 3/2014 | Yoshida et al. | |

OTHER PUBLICATIONS

O. Yoshida, U.S. PTO Official Action, U.S. Appl. No. 13/851,568, dated Jul. 11, 2014, 7 pages.
USPTO Notice of Allowance of U.S. Appl. No. 13/851,568 mailed Dec. 12, 2014; 8 pages.

* cited by examiner

TORQUE SENSOR AND POWER STEERING SYSTEM USING THE TORQUE SENSOR

BACKGROUND OF THE INVENTION

The present invention relates to a torque sensor that detects a steering torque of a driver and a power steering system using the torque sensor. The present invention is applied to the power steering system of a vehicle etc.

For instance, as a related art torque sensor applied to the power steering system of the vehicle, it has been disclosed in Japanese Patent Provisional Publication No. 2004-309463 (hereinafter is referred to as "JP2004-309463").

A brief explanation of a configuration of the torque sensor in JP2004-309463 will be given here.

The torque sensor has a magnetic member, first and second yoke members, first and second magnetic flux concentrators and a magnetic sensor.

A steering shaft is formed by two shaft members that are relatively rotatably connected to each other through a torsion bar.

The magnetic member is fixed onto an outer periphery of one shaft member of the steering shaft, and has a plurality of magnetic poles in a circumferential direction.

The first and second yoke members are a pair of ring members formed by soft magnetic material, and are fixed onto an outer periphery of the other shaft member of the steering shaft through a certain holder. Each of these ring-shaped first and second yoke members has a plurality of nail portions (fingernails) that extend in a radially inward direction, and the first and second yoke members are arranged so that the nail portions of the first yoke member and the nail portions of the second yoke member face each other (or are opposite to each other) in an axial direction.

The first and second magnetic flux concentrators are each arranged at a part of area, in the circumferential direction, of the first and second yoke members so that the first and second magnetic flux concentrators face each other (or are opposite to each other) between the first and second yoke members in the axial direction. The first and second magnetic flux concentrators are a pair of magnetic flux concentrators by which magnetic field is generated between the yoke members.

The magnetic sensor is accommodated in an air gap formed between the first and second magnetic flux concentrators, and detects magnetic flux that passes between these first and second magnetic flux concentrators.

The torque sensor of JP2004-309463 detects a torque that is inputted to the steering shaft, according to change of the magnetic flux (magnetic flux density) detected by the magnetic sensor.

SUMMARY OF THE INVENTION

In the case of the torque sensor of JP2004-309463, however, since the both magnetic flux concentrators are configured to be exposed to the outside especially without being shielded, there arises a problem that the magnetic flux concentrators collect not only magnetic field generated by the magnetic member but also other external magnetic field (i.e. so-called disturbance). As a consequence, the magnetic sensor detects some magnetic flux caused by the external magnetic field, and an accurate torque detection may not be performed.

In the following description in the present specification, magnetic field generated by the magnetic member provided in the torque sensor is defined as an internal magnetic field, while magnetic field generated by external factors except the magnetic member is defined as the external magnetic field.

An object of the present invention is to provide a torque sensor and a power steering system using the torque sensor, which is capable of suppressing decrease in torque detection accuracy which is caused by the detection of the external magnetic field by the magnetic sensor.

According to one aspect of the present invention, a torque sensor detecting a torque generated in a rotation member that is formed by a first shaft member and a second shaft member both of which are connected through a torsion bar, the torque sensor comprises: a magnetic member provided at the first shaft member so as to rotate integrally with the first shaft member and having different magnetic poles that are alternately arranged in a circumferential direction concentrically with a rotation axis of the rotation member; a first yoke member formed by magnetic material and provided at the second shaft member so as to rotate integrally with the second shaft member, the first yoke member having (a) a plurality of first nail portions that are arranged concentrically with the rotation axis so as to face the magnetic member in a radial direction of the rotation axis and (b) a first ring portion that connects the first nail portions together; a second yoke member formed by magnetic material and provided at the second shaft member so as to rotate integrally with the second shaft member, the second yoke member having (c) a plurality of second nail portions that are arranged concentrically with the rotation axis in such a way that the first nail portions and the second nail portions are alternately arranged in the circumferential direction and the second nail portions face the magnetic member in the radial direction of the rotation axis and (d) a second ring portion that is arranged at an outer circumferential side of the first ring portion so as to be separated from and face the first ring portion and connects the second nail portions together; a first magnetic flux concentration ring formed by magnetic material and having a substantially arc-shape in a horizontally-cut cross section, the first magnetic flux concentration ring provided between the first ring portion and the second ring portion so that the first magnetic flux concentration ring and the first ring portion are arranged in layers each other in the radial direction and generating thereinside magnetic field by magnetic field generated in the first ring portion; a second magnetic flux concentration ring formed by magnetic material and having a substantially arc-shape in a horizontally-cut cross section, the second magnetic flux concentration ring provided between the second ring portion and the first magnetic flux concentration ring so that the second magnetic flux concentration ring and the second ring portion are arranged in layers each other in the radial direction and generating thereinside magnetic field by magnetic field generated in the second ring portion; and a magnetic sensor arranged between the first and second magnetic flux concentration rings and having a Hall device that detects a change of internal magnetic field between the first and second magnetic flux concentration rings which occurs by receiving the magnetic field between the first and second ring portions which changes according to a change of a relative angle between the first and second nail portions and the magnetic member in response to torsion deformation of the torsion bar. And the torque generated in the rotation member is detected on the basis of an output signal of the magnetic sensor.

According to another aspect of the present invention, a power steering system comprises: a steering mechanism having a steering shaft formed by an input shaft which rotates according to a steering operation of a steering wheel and an output shaft to which a rotation of the input shaft is transmitted by being connected to the input shaft through a torsion bar and a conversion mechanism which converts a rotation of the output shaft to a steering motion of steered road wheels; a torque sensor that detects a steering torque generated in the steering shaft; and an electric motor that provides a steering force to the steering mechanism on the basis of an output signal of the torque sensor. And the torque sensor has: a magnetic member provided at the first shaft member so as to rotate integrally with the first shaft member and having different magnetic poles that are alternately arranged in a circumferential direction concentrically with a rotation axis of the rotation member; a first yoke member formed by magnetic material and provided at the second shaft member so as to rotate integrally with the second shaft member, the first yoke member having (a) a plurality of first nail portions that are arranged concentrically with the rotation axis so as to face the magnetic member in a radial direction of the rotation axis and (b) a first ring portion that connects the first nail portions together; a second yoke member formed by magnetic material and provided at the second shaft member so as to rotate integrally with the second shaft member, the second yoke member having (c) a plurality of second nail portions that are arranged concentrically with the rotation axis in such a way that the first nail portions and the second nail portions are alternately arranged in the circumferential direction and the second nail portions face the magnetic member in the radial direction of the rotation axis and (d) a second ring portion that is arranged at an outer circumferential side of the first ring portion so as to be separated from and face the first ring portion and connects the second nail portions together; a first magnetic flux concentration ring formed by magnetic material and having a substantially arc-shape in a horizontally-cut cross section, the first magnetic flux concentration ring provided between the first ring portion and the second ring portion so that the first magnetic flux concentration ring and the first ring portion are arranged in layers each other in the radial direction and generating thereinside magnetic field by magnetic field generated in the first ring portion; a second magnetic flux concentration ring formed by magnetic material and having a substantially arc-shape in a horizontally-cut cross section, the second magnetic flux concentration ring provided between the second ring portion and the first magnetic flux concentration ring so that the second magnetic flux concentration ring and the second ring portion are arranged in layers each other in the radial direction and generating thereinside magnetic field by magnetic field generated in the second ring portion; and a magnetic sensor arranged between the first and second magnetic flux concentration rings and having a Hall device that detects a change of internal magnetic field between the first and second magnetic flux concentration rings which occurs by receiving the magnetic field between the first and second ring portions which changes according to a change of a relative angle between the first and second nail portions and the magnetic member in response to torsion deformation of the torsion bar.

The other objects and features of this invention will become understood from the following description with reference to the accompanying drawings.

BRIEF DESCRIPTION OF THE DRAWINGS

FIG. 9A is a side view of the torque sensor. FIG. 9B is a bottom view of the torque sensor. FIG. 9C is a longitudinal cross section of the torque sensor, taken along a C-C line of FIG. 9B. FIG. 9D is an enlarged view of a main part of FIG. 9C.

FIG. 10A is a side view of the torque sensor. FIG. 10B is a bottom view of the torque sensor. FIG. 10C is a longitudinal cross section of the torque sensor, taken along a D-D line of FIG. 10B. FIG. 10D is an enlarged view of a main part of FIG. 10C.

FIG. 11A is a longitudinal cross section of the torque sensor. FIG. 11B is an enlarged view of a main part of FIG. 11A, which shows an influence of a radial direction magnetic flux of an external magnetic field upon magnetic flux concentration rings. FIG. 11C is an enlarged view of a main part of FIG. 11A, which shows an influence of an axial direction magnetic flux of the external magnetic field upon the magnetic flux concentration rings.

FIG. 12A is a longitudinal cross section of the torque sensor. FIG. 12B is an enlarged view of a main part of FIG. 12A, which shows an influence of a radial direction magnetic flux of the external magnetic field upon the magnetic flux concentration rings. FIG. 12C is an enlarged view of a main part of FIG. 12A, which shows an influence of an axial direction magnetic flux of the external magnetic field upon the magnetic flux concentration rings.

FIG. 13A is a sectional view of the torque sensor, corresponding to the sectional view taken along the B-B line of FIG. 6. FIG. 13B is a longitudinal cross section, taken along an E-E line of FIG. 13A.

DETAILED DESCRIPTION OF THE INVENTION

Embodiments of a torque sensor and a power steering system using the torque sensor of the present invention will be explained below with reference to the drawings. In the following description, examples in which the torque sensor is applied to a rack-and-pinion gear type electric power steering system of a vehicle will be explained.

Figure 1:
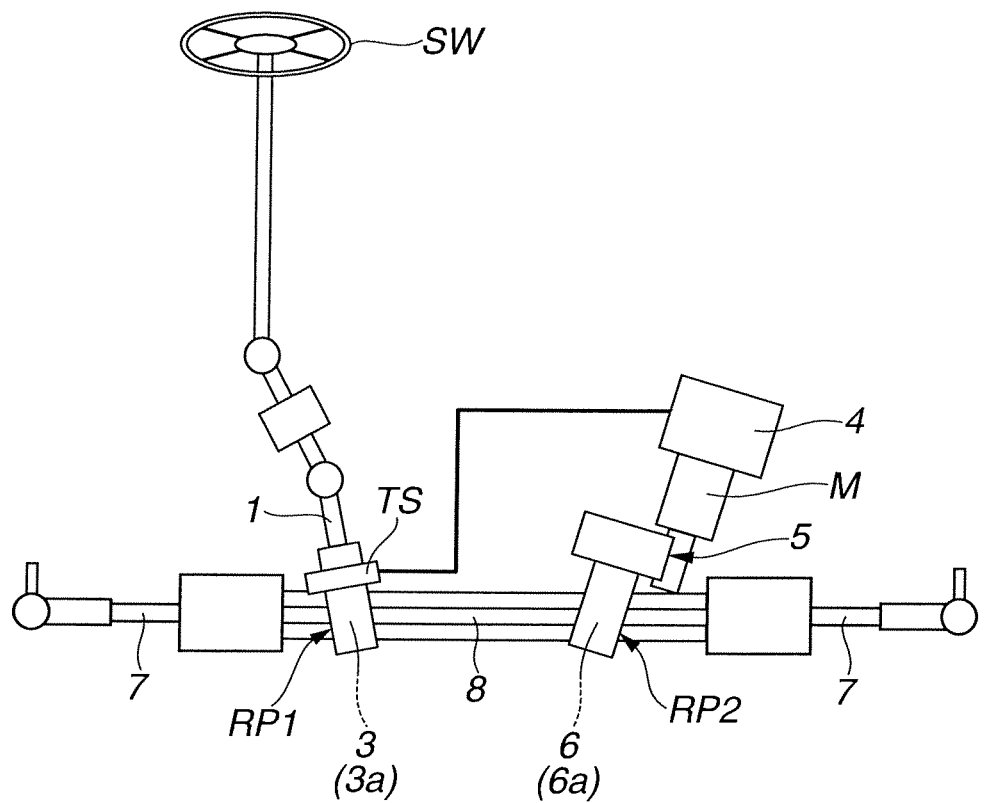
FIG. 1 is a schematic view showing a configuration of a power steering system of the present invention.

FIGS. 1 to 8 show a first embodiment of the torque sensor etc. of the present invention. As shown in FIG. 1, in an electric power steering system to which the torque sensor is applied, a steering shaft (a rotation member), which is formed by an input shaft 1 (a second shaft member in the present invention) whose one end side is connected to a steering wheel SW and a first output shaft 3 (a first shaft member in the present invention) whose one end side is relatively rotatably connected to the input shaft 1 through a torsion bar 2, is linked with steered road wheels (not shown) through a first rack-and-pinion gear mechanism RP1 that is provided at one side, in a vehicle body width direction, of the vehicle. A torque sensor TS is set at an outer periphery of the steering shaft, and an electric motor M driven and controlled by an ECU 4 on the basis of an output signal of the torque sensor TS is provided. Further, a second output shaft 6, to which the electric motor M is coupled via a certain speed reduction gear mechanism 5 (e.g. a worm gear), is linked with the steered road wheels (not shown) through a second rack-and-pinion gear mechanism RP2 that is provided at the other side, in the vehicle body width direction, of the vehicle.

The first rack-and-pinion gear mechanism RP1 has a pinion gear 3a that is provided at the other end side of the first output shaft 3 and a first rack teeth (not shown) that is provided at one end side of a rack bar 8 whose both ends are linked with the steered road wheels through tie rods 7, 7. The second rack-and-pinion gear mechanism RP2 has a second pinion gear 6a that is coupled with a top end portion of the second output shaft 6 and a second rack teeth (not shown) that is provided at the other end side of the rack bar 8.

By the above configuration, the torsion bar 2 twists on the basis of a steering torque inputted to the input shaft 1 from the steering wheel SW, and the first output shaft 3 rotates according to a rotation torque that is generated upon restoring of the torsion bar 2 from or in response to the twist (torsion deformation) of the torsion bar 2. This rotary motion of the first output shaft 3 is converted to a rectilinear motion of the rack bar 8 through the first rack-and-pinion gear mechanism RP1. On the other hand, the second output shaft 6 rotates according to a steering assist torque that is generated at the electric motor M on the basis of the steering torque, and this rotary motion of the second output shaft 6 is converted to a rectilinear motion of the rack bar 8 through the second rack-and-pinion gear mechanism RP2. With these conversion mechanisms, a direction of the steered road wheels is changed while being provided with a steering assist by the electric motor M.

Figure 2:
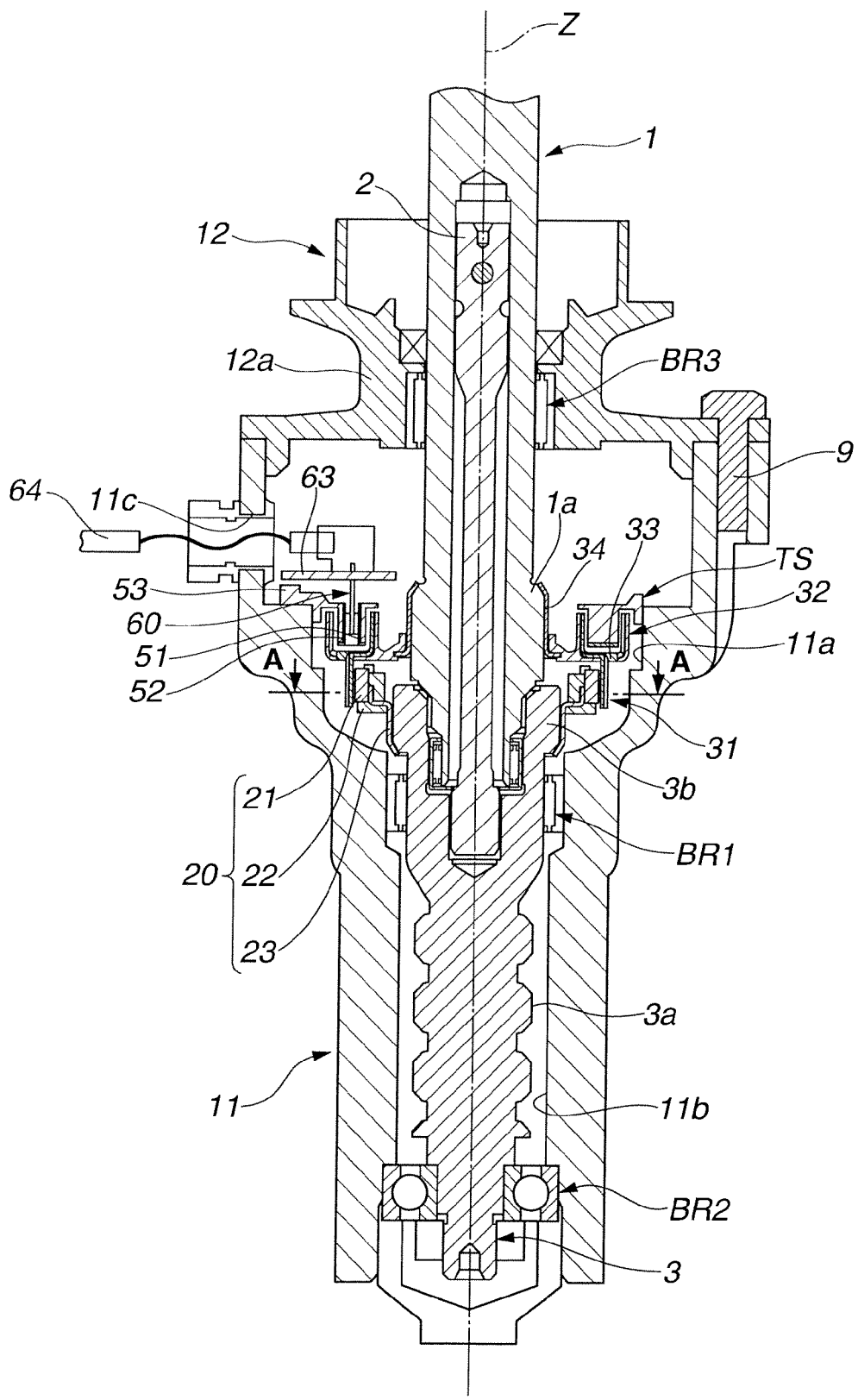
FIG. 2 is a drawing that shows a torque sensor etc. of a first embodiment, and is a longitudinal cross section of a steering system (around a first rack-and-pinion gear mechanism) shown in FIG. 1.
Figure 3:
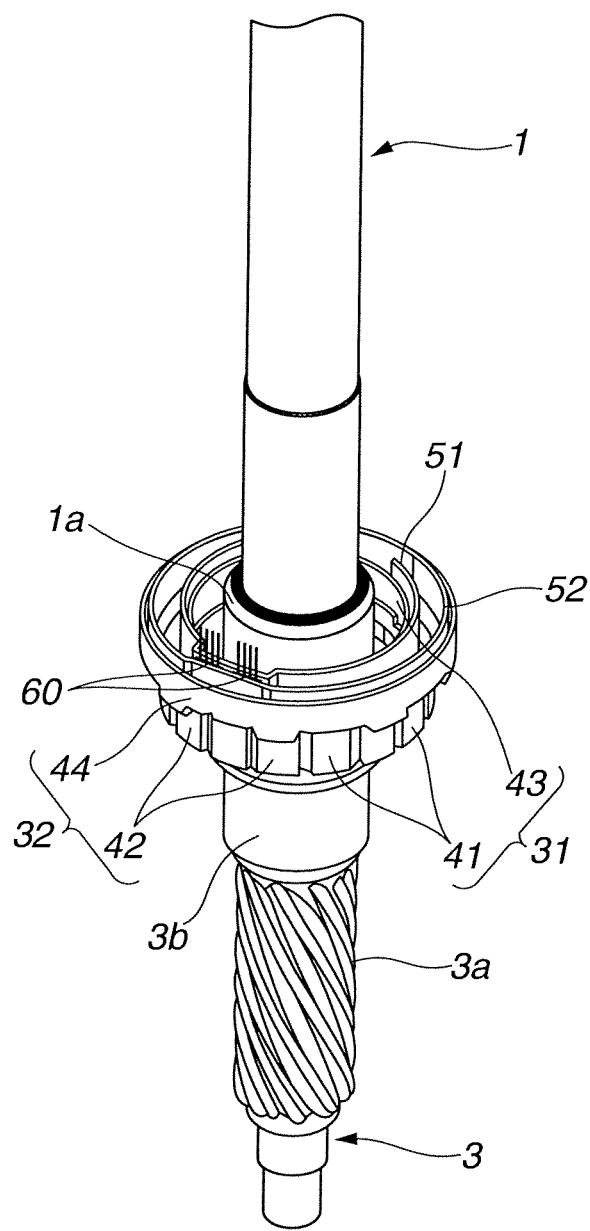
FIG. 3 is a perspective view of the torque sensor shown in FIG. 2.
Figure 4:
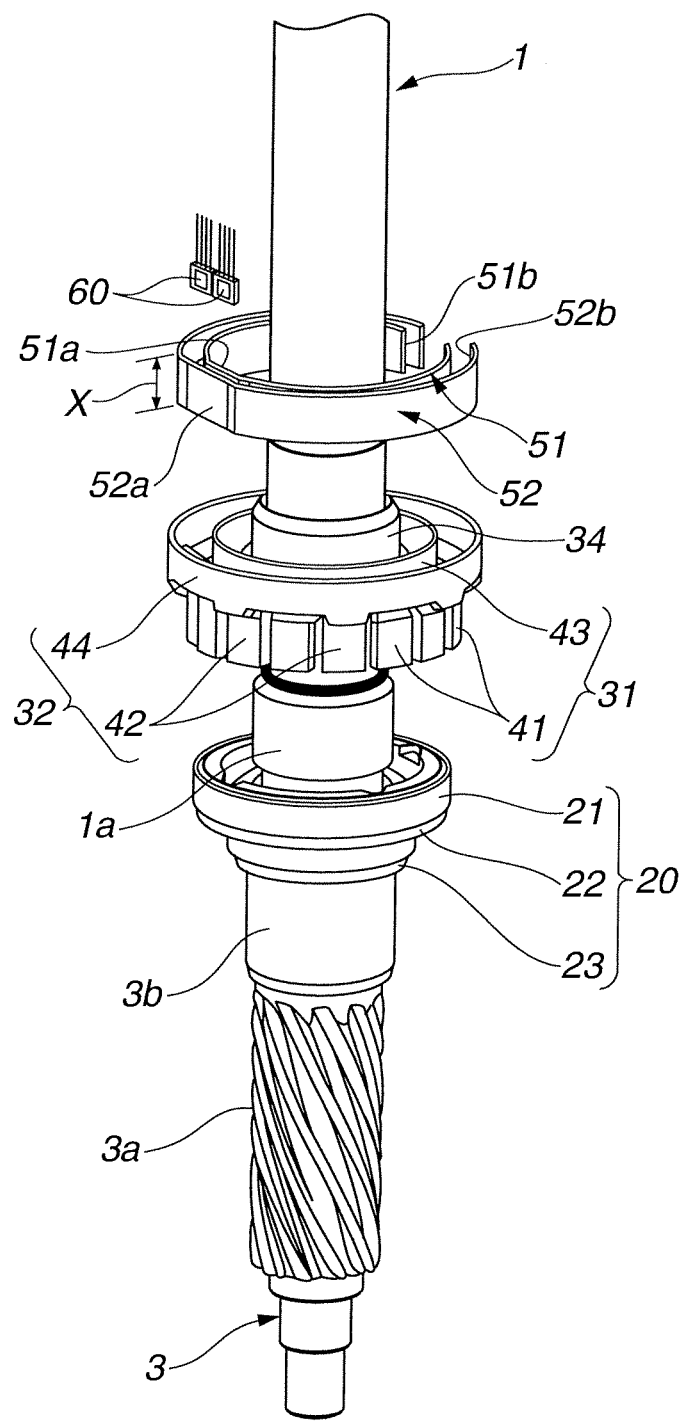
FIG. 4 is a perspective exploded view of the torque sensor shown in FIG. 3.
Figure 5:
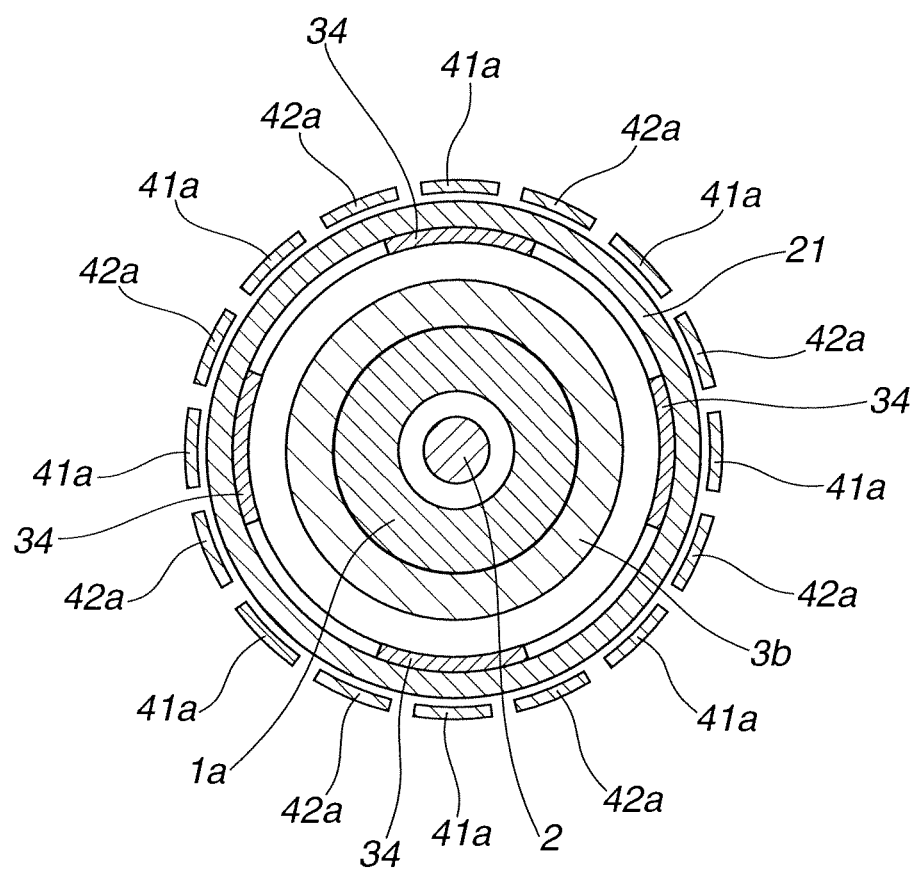
FIG. 5 is a sectional view of the torque sensor, taken along an A-A line of FIG. 2.

As shown in FIG. 2, with respect to the steering shaft, the other end side of the input shaft 1 and whole of the first output shaft 3 are housed inside a first gear housing 10 that houses therein the first rack-and-pinion gear mechanism RP1. The first gear housing 10 is formed, for instance, by non-magnetic material. The first gear housing 10 is formed from a pair of housing forming members of a housing body 11 and a housing cover 12 by connecting these members together with a plurality of bolts 9 arranged in a circumferential direction. The housing body 11 is a substantially cylindrical housing that houses therein the whole of the first output shaft 3. The housing cover 12 is a cover that covers or closes one end side opening that is an upper end portion of the housing body 11.

The housing body 11 has a large diameter section 11a formed stepwise by enlarging a diameter of the one end side of the housing body 11 and a small diameter section 11b having a relatively small diameter and formed by setting a diameter (an inside diameter) of the other side of the housing body 11 to be slightly greater than an outside diameter of the first output shaft 3. Then, the torque sensor TS is provided at an outer peripheral area of a connection of the input shaft 1 and the first output shaft 3 where the other end portion of the input shaft 1 which is housed in the large diameter section 11a and the one end portion of the first output shaft 3 are connected.

A pair of bearings BR1, BR2 are provided at both end portions of the small diameter section 11b of the housing body 11, and the first output shaft 3 is rotatably supported by a pair of the bearings BR1, BR2. On the other hand, a bearing BR3 is also provided at an inner periphery of a constricted portion 12a formed in a middle in an axial direction of the housing cover 12, and the input shaft 1 is rotatably supported by the bearing BR3.

As shown in FIGS. 2 to 6, the torque sensor TS mainly has a magnetic member 20, a pair of first and second yoke members 31, 32, a pair of first and second magnetic flux concentration rings 51, 52 and a pair of magnetic sensors 60, 60.

The magnetic member 20 is formed into a substantially cylindrical shape. The magnetic member 20 is fixed onto an outer periphery of the one end portion of the first output shaft 3, then rotates integrally with the first output shaft 3.

Figure 6:
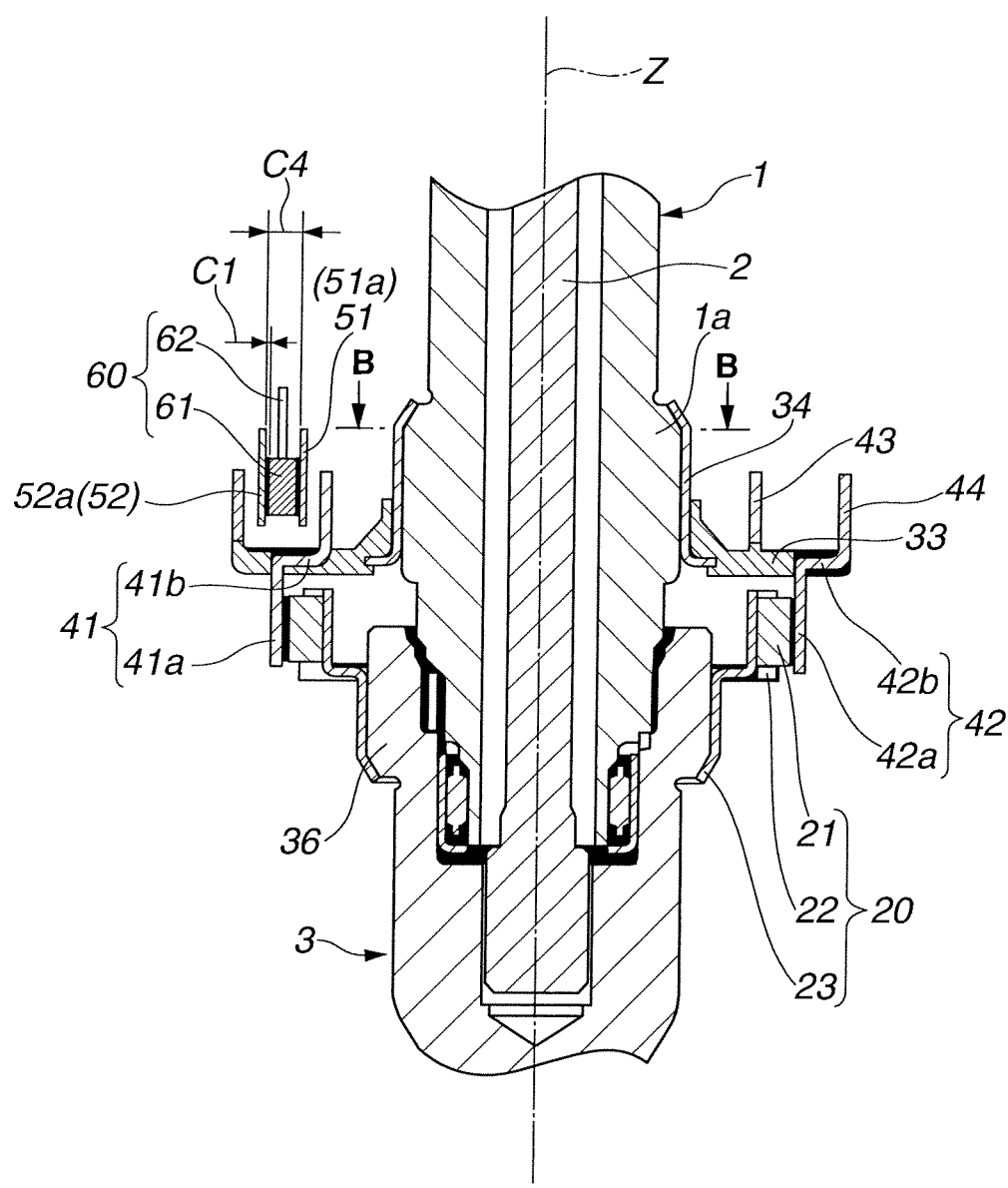
FIG. 6 is an enlarged view of a main part around the torque sensor shown in FIG. 2.

The first and second yoke members 31, 32 are formed by soft magnetic material, and have a substantially cylindrical shape. The first and second yoke members 31, 32 are both fixed onto an outer periphery of the other end portion of the input shaft 1, then rotate integrally with the input shaft 1. As can be seen in FIG. 6, the first and second yoke members 31, 32 are arranged so that each one end side (each lower end portion side in FIG. 6, which corresponds to after-mentioned first nail portion 41 and second nail portion 42) of the first and second yoke members 31, 32 faces the magnetic member 20 in a radial direction without making contact with the magnetic member 20.

The first and second magnetic flux concentration rings 51, 52 are disposed in a radial direction space formed between the first and second yoke members 31, 32 at the other end side (upper end portion sides in FIG. 6, which corresponds to after-mentioned first ring portion 43 and second ring portion 44) of the first and second yoke members 31, 32. The first and second magnetic flux concentration rings 51, 52 have such substantially ring shape that magnetic field (magnetic flux) generated by the magnetic member 20 and leaking to the other end side of the first and second yoke members 31, 32 is concentrated or collected in a predetermined area.

The magnetic sensors 60, 60 are accommodated between the first and second magnetic flux concentration rings 51, 52 with the magnetic sensors 60, 60 spaced a predetermined air gap C1 from the first and second magnetic flux concentration rings 51, 52. The magnetic sensors 60, 60 detect the magnetic flux that passes between the first and second magnetic flux concentration rings 51, 52.

The magnetic member 20 has a ring-shaped permanent magnet 21 formed by magnetic material, a substantially cylindrical sleeve 23 formed by a predetermined metal material, and an insulator 22 formed by a predetermined resin material.

The permanent magnet 21 has a plurality of different magnetic poles (the north pole (N pole) and the south pole (S pole), in the present embodiment, each 8 poles, all 16 poles) alternately arranged in the circumferential direction. One end side of the sleeve 23 is joined to an inner peripheral portion of the permanent magnet 21 in an insulation manner through the resin-made insulator 22.

The magnetic member 20 is formed, as one unit, by molding (using a mold) of the permanent magnet 21 and the sleeve 23 with the resin material (the resin-made insulator 22). Then, the sleeve 23 is fitted onto a large diameter portion 3b that is formed stepwise at the outer periphery of the one end portion of the first output shaft 3, and a top edge of the sleeve 23 is laser-welded along the circumferential direction, the magnetic member 20 is thus fixed onto the outer periphery of the first output shaft 3 through the sleeve 23.

The first yoke member 31 is formed into such crank shape in vertically-cut cross section that the one end side (the lower end portion side in FIG. 6) of the first yoke member 31 has a relatively large diameter and the other end side (the upper end portion side in FIG. 6) of the first yoke member 31 has a relatively small diameter. More specifically, at the one end side (the lower end portion side in FIG. 6) of the first yoke member 31, a plurality of the first nail portions 41 are formed so that its vertically-cut cross section is such inverted L-shape that the one end side of the first yoke member 31 widens or extends in a radially outward direction. Also, the first nail portions 41 are set concentrically with the steering shaft (a rotation axis Z) so that the first nail portions 41 are arranged at predetermined circumferential direction intervals at an outer peripheral area of the magnetic member 20. On the other hand, at the other end side (the upper end portion side in FIG. 6) of the first yoke member 31, the first ring portion 43 having a ring shape that continues along the circumferential direction of the rotation axis Z is formed. The first ring portion 43 connects the first nail portions 41 together by connecting with each base portion of the first nail portions 41. The first yoke member 31 is formed by the first nail portions 41 and the first ring portion 43, described above.

The second yoke member 32 is formed into such crank shape in vertically-cut cross section that the one end side (the lower end portion side in FIG. 6) of the second yoke member 32 has a relatively small diameter and the other end side (the upper end portion side in FIG. 6) of the second yoke member 32 has a relatively large diameter. More specifically, at the one end side (the lower end portion side in FIG. 6) of the second yoke member 32, a plurality of the second nail portions 42 are formed so that its vertically-cut cross section is such inverted L-shape that the one end side of the second yoke member 32 shrinks or shortens in a radially inward direction. Also, the second nail portions 42 are set concentrically with the steering shaft (the rotation axis Z) at the outer peripheral area of the magnetic member 20 so that the second nail portions 42 are arranged at predetermined circumferential direction intervals in such a way that the second nail portion 42 and the first nail portion 41 are alternately arranged on the same circumference of a circle as that of the first nail portions 41. On the other hand, at the other end side (the upper end portion side in FIG. 6) of the second yoke member 32, the second ring portion 44 having a ring shape that continues along the circumferential direction of the rotation axis Z is formed. The second ring portion 44 connects the second nail portions 42 together by connecting with each base portion of the second nail portions 42. The second yoke member 32 is formed by the second nail portions 42 and the second ring portion 44, described above.

The first yoke member 31 and the second yoke member 32 are set so that, each first nail portion 41 and each second nail portion 42 are alternately arranged on the same circumference of the circle, also the second ring portion 44 is positioned at outer circumferential side of the first ring portion 43 and is separated from and faces the first ring portion 43 in the radial direction. In this arrangement state, adjoining or adjacent first and second nail portions 41, 42 are joined to each other through an insulator 33 that is formed by the same resin material as that of the insulator 22 of the magnetic member 20.

Further, as shown in FIG. 6, a substantially cylindrical sleeve 34 formed by predetermined metal material is provided at an inner circumferential side of the first ring portion 43 and joined to the first and second yoke members 31, 32 through the insulator 33. The first and second yoke members 31, 32 are then fixed onto the outer periphery of the input shaft 1 through the sleeve 34.

As a fixing manner of the first and second yoke members 31, 32 onto the outer periphery of the input shaft 1, as same manner as the magnetic member 20, the sleeve 34 is fitted onto a large diameter portion $1b$ that is formed stepwise at the outer periphery of the other end portion of the input shaft 1, and a top edge of the sleeve 34 is laser-welded along the circumferential direction, then the first and second yoke members 31, 32 are fixed onto the outer periphery of the input shaft 1 through the sleeve 34.

The first and second nail portions 41, 42 respectively have first and second axial direction extending portions $41a$, $42a$ and first and second radial direction extending portions $41b$, $42b$.

The first and second axial direction extending portions $41a$, $42a$ extend along the axial direction (in a shaft direction) of the rotation axis Z, and face the permanent magnet 21 in the radial direction.

The first and second radial direction extending portions $41b$, $42b$ are provided so as to bend from the first and second axial direction extending portions $41a$, $42a$ respectively, and extend along the radial direction of the rotation axis Z.

Here, as shown in FIG. 6, each axial direction length of the first and second axial direction extending portions $41a$, $42a$ is set to be at least greater than an axial direction length of the permanent magnet 21. Then, the first and second axial direction extending portions $41a$, $42a$ and the permanent magnet 21 are configured so that the permanent magnet 21 is completely enclosed or surrounded with the first and second axial direction extending portions $41a$, $42a$ from a radial direction outer side.

Figure 7:
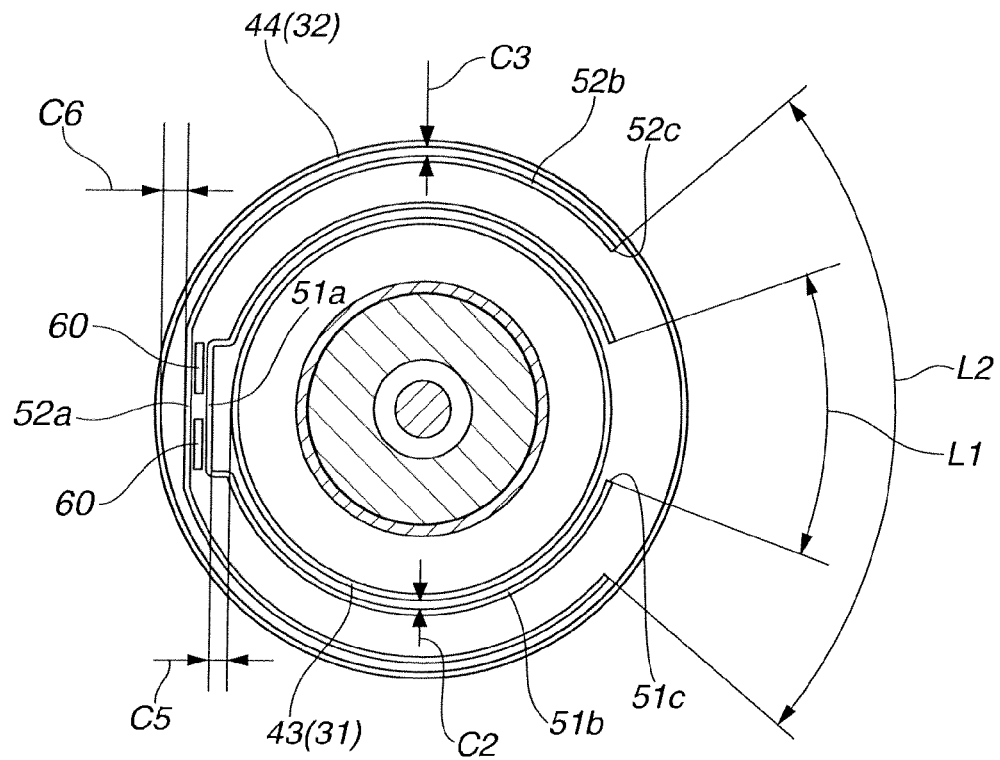
FIG. 7 is a sectional view of the torque sensor, taken along a B-B line of FIG. 6.

As shown in FIG. 7, the first and second magnetic flux concentration rings 51, 52 are formed, by press molding, into an arc-shape having both edges in the circumferential direction and extending over 180 degrees along the circumferential direction so as to surround or enclose the rotation axis Z in a predetermined area over 180 degrees in the circumferential direction of the rotation axis Z. Further, the first and second magnetic flux concentration rings 51, 52 are set so as to overlap with each other in the axial direction when viewed from the radial direction (so as to be arranged in layers each other in the radial direction) and so that a radial direction opposing gap C2 between the first magnetic flux concentration ring 51 and the first ring portion 43 and a radial direction opposing gap C3 between the second magnetic flux concentration ring 52 and the second ring portion 44 are equal to each other (C2=C3), with the first magnetic flux concentration ring 51 positioned at an inner circumferential side and the second magnetic flux concentration ring 52 positioned at an outer circumferential side.

The first and second magnetic flux concentration rings 51, 52 are provided with first and second flat portions $51a$, $52a$ (described later), each of which is formed at a part, in the radial direction, of the first and second magnetic flux concentration rings 51, 52 so as to face each other. Then, a pair of the magnetic sensors 60, 60 are accommodated in a radial direction space C4 (see FIG. 6) formed by the first and second flat portions $51a$, $52a$.

That is, the first magnetic flux concentration ring 51 is formed into a substantially ring shape that extends or ranges over a wide area in the circumferential direction of nearly 320 degrees, also the first magnetic flux concentration ring 51 is provided, at an opposite side (at a position symmetrical about a center) to a first cutting portion $51c$ formed by being cut in the circumferential direction, with the first flat portion $51a$ that is a first sensor facing area. As can be seen in FIG. 7, the first flat portion $51a$ is formed by the fact that a certain circumferential direction area positioned at the opposite side to the first cutting portion 51c protrudes in the radially outward direction so as to have convex shape or protuberance in horizontally-cut cross section.

The second magnetic flux concentration ring 52 is formed into a substantially ring shape that extends or ranges over an area in the circumferential direction of nearly 290 degrees that is narrower than the first magnetic flux concentration ring 51, also the second magnetic flux concentration ring 52 is provided, at an opposite side (at a position symmetrical about a center) to a second cutting portion 52c formed by being cut in the circumferential direction, with the second flat portion 52a that is a second sensor facing area. As can be seen in FIG. 7, the second flat portion 52a is formed by the fact that a certain circumferential direction area positioned at the opposite side to second cutting portion 52c is pressed in the radially inward direction so as to become a flat shape.

Here, since the first and second magnetic flux concentration rings 51, 52 are rings that are formed into the arc-shape surrounding the rotation axis Z, these magnetic flux concentration rings 51, 52 can be formed only by pressing a metal plate along a circumference of the rotation axis Z. This brings about reduction in cost of manufacturing of the torque sensor TS. In addition, as described above, both of the first and second magnetic flux concentration rings 51, 52 are formed into C-shaped ring in horizontally-cut cross section which extends over 180 degrees along the circumferential direction so as to surround the rotation axis Z in the predetermined area over 180 degrees in the circumferential direction of the rotation axis Z. Thus, even in a case where each position of the first and second magnetic flux concentration rings 51, 52 shifts in the radial direction, a detection error of the magnetic sensor 60 due to the position shift of the first and second magnetic flux concentration rings 51, 52 can be suppressed.

Further, with respect to the first flat portion 51a, as shown in FIG. 7, when a circumferential direction outer side area of the first flat portion 51a is termed a first arc portion 51b, the first flat portion 51a is offset to an outer side so that a radial direction space C5 between the first flat portion 51a and the first ring portion 43 is at least greater than the radial direction gap C2 between the first arc portion 51b and the first ring portion 43 (i.e. C2<C5).

Likewise, also as for the second flat portion 52a, when a circumferential direction outer side area of the second flat portion 52a is termed a second arc portion 52b, the second flat portion 52a is offset to an inner side so that a radial direction space C6 between the second flat portion 52a and the second ring portion 44 is at least greater than the radial direction gap C3 between the second arc portion 52b and the second ring portion 44 (i.e. C3<C6).

The first and second magnetic flux concentration rings 51, 52 are joined to each other through an insulator 53 (see FIG. 2) that is formed by the same resin material as that of the insulators 22 and 33 of the magnetic member 20 and the first and second yoke members 31, 32. Also, the first and second magnetic flux concentration rings 51, 52 are fixed to the large diameter section 11a of the housing body 11 through the insulator 53 by a certain fixing manner (e.g. with bolts) so that at least a part of an axial direction area X (see FIG. 4) of the first and second magnetic flux concentration rings 51, 52 overlaps with the first and second ring portions 43, 44 in the axial direction when viewed from the radial direction (at least a part of an axial direction area X of the first and second magnetic flux concentration rings 51, 52 and the first and second ring portions 43, 44 are arranged in layers in the radial direction) between the first and second ring portions 43, 44.

As mentioned above, a pair of the magnetic sensors 60, 60 are accommodated in the radial direction space C4 between the first and second magnetic flux concentration rings 51, 52. Each of the magnetic sensors 60, 60 has a detecting portion 61 that is a Hall IC and a connecting terminal 62.

The detecting portion 61 has thereinside a Hall device and detects, by the Hall device, the magnetic field (the magnetic flux) that passes between the first and second magnetic flux concentration rings 51, 52 (between the first and second flat portions 51a, 52a).

The connecting terminal 62 is a terminal to connect the detecting portion 61 to a control board 63 (a circuit board, see FIG. 2) located above the torque sensor TS.

That is, each magnetic sensor 60 itself is secured by being connected to the control board 63 through the connecting terminal 62, and the magnetic sensors 60, 60 are accommodated in the radial direction space C4 between the first and second magnetic flux concentration rings 51, 52 (the first and second flat portions 51a, 52a) with the magnetic sensors 60, 60 spaced the predetermined air gap C1 from first and second magnetic flux concentration rings 51, 52 (the first and second flat portions 51a, 52a). The magnetic sensors 60, 60 detect, by using the Hall effect by the Hall device, magnetic flux density that passes between the first and second magnetic flux concentration rings 51, 52 by the detecting portions 61, 61. Then, a torque operation in the control board 63 is performed using an output signal that changes according to the detected magnetic flux density from the detecting portions 61, 61.

Here, as shown in FIG. 2, the control board 63 is connected to the ECU 4 (see FIG. 1) through a board-to-board connector 64 (also a harness) that is drawn to an inside of the housing body 11 via a window hole 11c formed on a side surface of the large diameter section 11a of the housing body 11. The window hole 11c is located at an axial direction one side of the rotation axis Z (at an upper end portion side in FIG. 2) with respect to the first and second yoke members 31, 32 and the first and second magnetic flux concentration rings 51, 52, namely that the window hole 11c is formed so as not to interfere with the first and second yoke members 31, 32 and the first and second magnetic flux concentration rings 51, 52 in the radial direction.

Next, function and effect of the torque sensor TS of the first embodiment will be explained with reference to FIGS. 1 to 8.

According to the torque sensor TS configured as above, when the steering torque is not generated between the input shaft 1 and the first output shaft 3 and the steering shaft is in a neutral position state, each boundary between the magnetic poles of the permanent magnet 21 is positioned exactly in a middle position in the circumferential direction between the first and second nail portions 41, 42, then magnetic path resistances of the permanent magnet 21 with respect to the first and second nail portions 41, 42 are equal to each other. As a result, the magnetic field generated in the permanent magnet 21 is short-circuited between the first and second nail portions 41, 42, and the magnetic field does not leak to the first and second ring portions 43, 44. The magnetic flux of the magnetic field is thus not detected by each magnetic sensor 60.

Subsequently, when the steering wheel SW is turned by driver's steering operation and the steering torque acts on the input shaft 1 (the steering torque is generated between the input shaft 1 and the first output shaft 3), each boundary between the magnetic poles of the permanent magnet 21 shifts to one side in the circumferential direction of the first and second nail portions 41, 42, then magnetic path resistance of the one side to which each boundary shifts in the circumferential direction, among the magnetic path resistances of the permanent magnet 21 with respect to the first and second nail portions 41, 42, becomes large. As a result, the magnetic field generated in the permanent magnet 21 leaks to the first and second ring portions 43, 44 and flows to adjacent magnetic poles through the first and second ring portions 43, 44. As a consequence, the magnetic flux passes from one side to the other side between the first and second magnetic flux concentration rings 51, 52, and the magnetic flux density is detected by the magnetic sensors 60, 60. On the basis of the steering torque operated (calculated) by the output signal of the magnetic sensors 60, 60, an operation (calculation) of the steering assist torque by the electric motor M is performed in the ECU 4.

Upon the performance of the driver's steering operation, a steering direction and a providing direction of the steering assist torque are judged or determined by a direction of the magnetic flux passing between the first and second magnetic flux concentration rings 51, 52.

Figure 8:
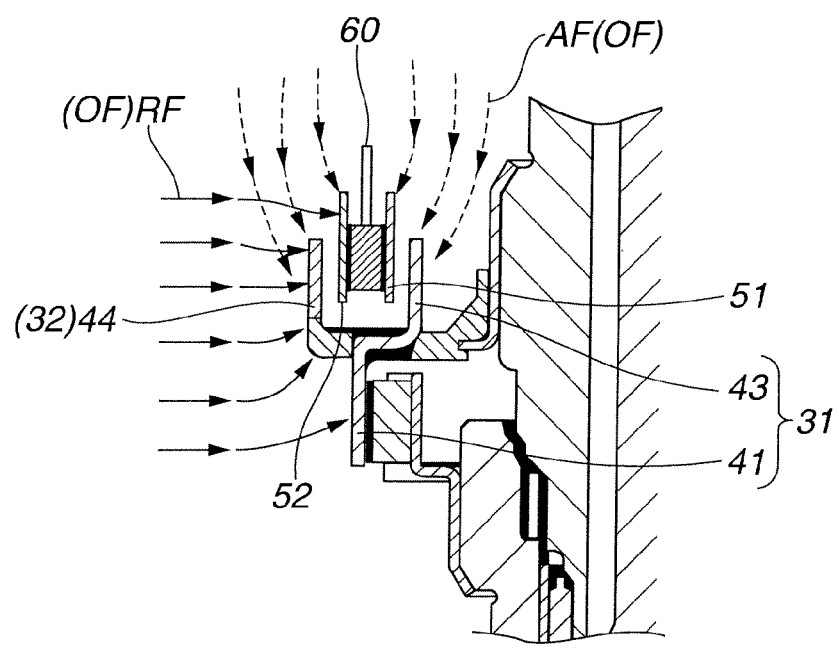
FIG. 8 is a local enlarged view of FIG. 6 for explaining function and effect of the first embodiment of the present invention.
Figure 9A:
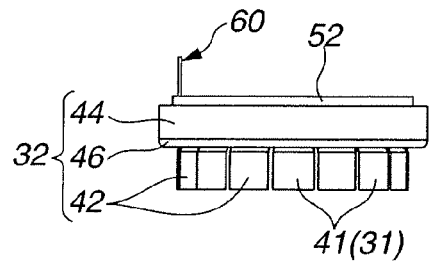
FIGS. 9A to 9D show a second embodiment of the torque sensor etc.
Figure 9B:
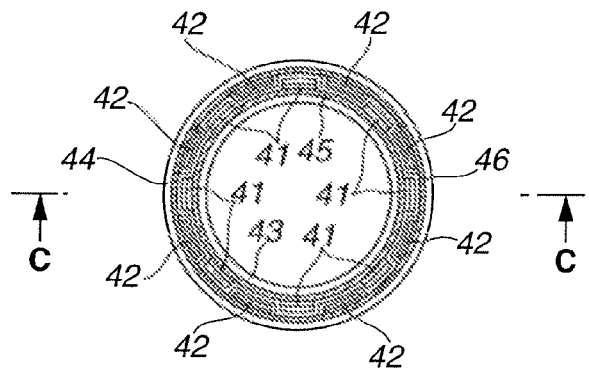
Figure 9C:
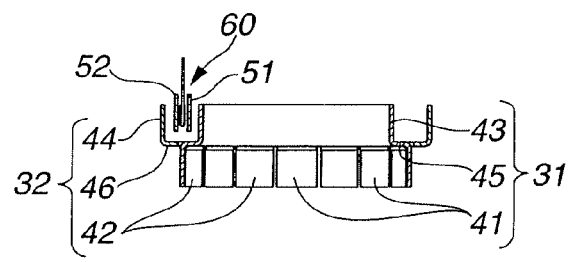
Figure 9D:
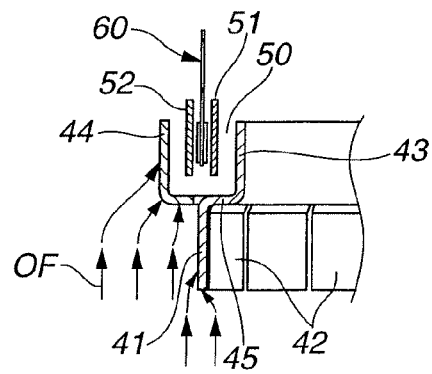
Figure 10A:
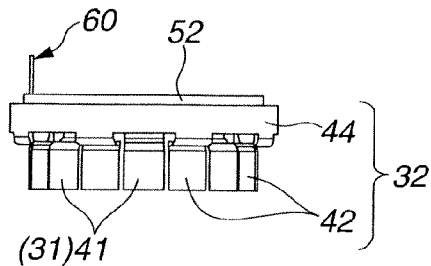
FIGS. 10A to 10D show a comparison example with the second embodiment.
Figure 10B:
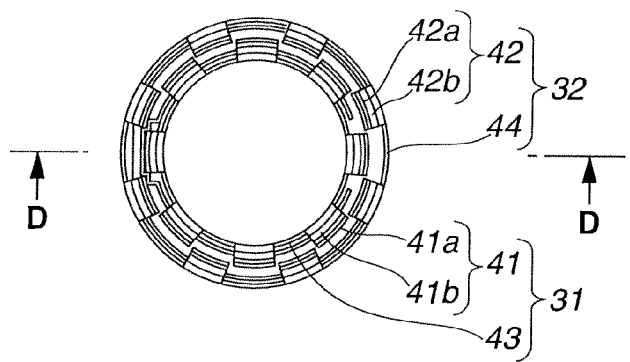
Figure 10C:
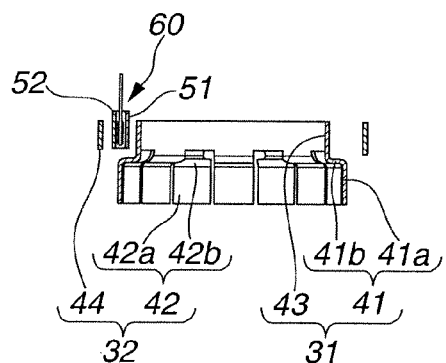
Figure 10D:
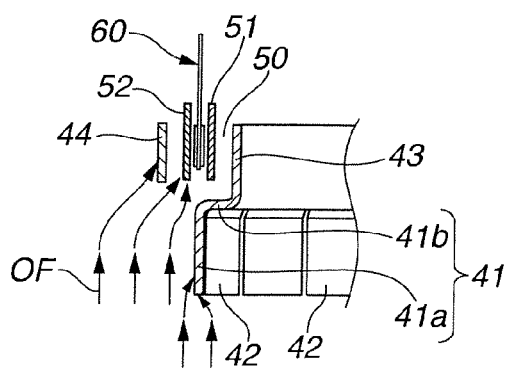

Here, upon detection of the torque, as same as the related art torque sensor, also the torque sensor TS is not shielded by using a certain shielding member. Thus, as shown in FIG. 8, not only an internal magnetic field by the permanent magnet 21 but also some external magnetic field OF which is unrelated to the permanent magnet 21 act on the first and second magnetic flux concentration rings 51, 52.

However, in the torque sensor TS in the present embodiment, a part of the axial direction area X of the first and second magnetic flux concentration rings 51, 52 is accommodated in a radial direction space between the first and second ring portions 43, 44, and overlaps with the first and second ring portions 43, 44 in the axial direction when viewed from the radial direction (a part of the axial direction area X of the first and second magnetic flux concentration rings 51, 52 and the first and second ring portions 43, 44 are arranged in layers in the radial direction). Because of this configuration or structure, a radial direction magnetic flux RF among the external magnetic field OF, which relates to a part of the axial direction area X accommodated between the first and second ring portions 43, 44, is received by the second ring portion 44 of the second yoke member 32 which is arranged at an outermost circumference. Therefore, when the radial direction magnetic flux RF received by the second ring portion 44 acts on the second magnetic flux concentration ring 52 through the second ring portion 44, the radial direction magnetic flux RF is attenuated to some extent by an air gap of the radial direction space C6. The action of the external magnetic field OF on a part of the axial direction area X is consequently reduced or diminished as compared with a case where the external magnetic field OF directly acts on the both magnetic flux concentration rings 51, 52 like the related art torque sensor.

As explained above, according to the torque sensor TS (the power steering system using the torque sensor TS) of the present embodiment, since a part of the axial direction area X of the first and second magnetic flux concentration rings 51, 52 is shielded (surrounded or enclosed) by the second ring portion 44 of the second yoke member 32 which is arranged at an outer circumferential side of a part of the axial direction area X, the action (transmission) of the external magnetic field OF on (to) the first and second magnetic flux concentration rings 51, 52 is suppressed by the second ring portion 44. As a consequence, the toque detection accuracy by the magnetic sensor 60, which tends to decrease due to the external magnetic field (due to detection of the external magnetic field), can be improved.

Further, with regard to the radial direction space between the second magnetic flux concentration ring 52 and the second ring portion 44, the radial direction space C6 between the second flat portion 52a and the second ring portion 44 is set to be greater than the radial direction gap C3 between the second arc portion 52b and the second ring portion 44 (i.e. C3<C6). With this space setting (C3<C6), it is possible to increase an attenuation effect of the external magnetic field OF.

Moreover, by the fact that the external magnetic field OF transmitted through the second ring portion 44 bypasses the second flat portion 52a and is transmitted to the second arc portion 52b where the radial direction gap C3 between the second arc portion 52b and the second ring portion 44 is small (magnetic path resistance is small) as compared with the radial direction space C6, a transmission route of the external magnetic field OF to the magnetic sensors 60, 60 extends. As a consequence, ill effects of the external magnetic field OF on the torque detection can be effectively reduced.

In addition, also as for the first magnetic flux concentration ring 51, the first flat portion 51a is formed so as to protrude to the outer side so that the radial direction space C5 between the first flat portion 51a and the first ring portion 43 is greater than the radial direction gap C2 between the first arc portion 51b and the first ring portion 43 (i.e. C2<C5). With this space setting (C2<C5), the radial direction space C4 between the first and second flat portions 51a, 52a becomes narrow, then the torque detection accuracy by the magnetic sensor 60 can be improved.

Additionally, a circumferential length (an entire length) of the first magnetic flux concentration ring 51, which tends to be shorter than that of the second magnetic flux concentration ring 52 due to the fact that the first magnetic flux concentration ring 51 is arranged at the inner circumferential side, elongates, thereby equalizing both magnetic path resistances of the first and second magnetic flux concentration rings 51, 52.

Furthermore, regarding the both magnetic flux concentration rings 51, 52, the first and second magnetic flux concentration rings 51, 52 are formed so that, a circumferential direction angle area of the first magnetic flux concentration ring 51 positioned at the inner circumferential side is narrower, and a circumferential direction angle area of the second magnetic flux concentration ring 52 positioned at the outer circumferential side is wider, namely that, as shown in FIG. 7, a circumferential direction length L2 (a circumferential direction opening length L2) of the second cutting portion 52c is greater than a circumferential direction length L1 (a circumferential direction opening length L1) of the first cutting portion 51c (i.e. L1<L2). With this configuration (L1<L2), both circumferential lengths of the first and second magnetic flux concentration rings 51, 52 are substantially equalized, and this also brings about equalization of the both magnetic path resistances of the first and second magnetic flux concentration rings 51, 52.

Here, if the both circumferential direction angle areas of the first and second magnetic flux concentration rings 51, 52 are set to be equal to each other, an opposing area between the second magnetic flux concentration ring 52 and the second ring portion 44 becomes greater by an area equivalent to the circumferential direction length of the second magnetic flux concentration ring 52 which is longer than that of the first magnetic flux concentration ring 51 due to the fact that the second magnetic flux concentration ring 52 is positioned at the outer circumferential side. As a result, an efficiency of the magnetic flux concentration of the second magnetic flux concentration ring 52 is increased, and this results in an unbalanced state of the magnetic path resistances of the first and second magnetic flux concentration rings 51, 52. However, as described above, by the fact that the circumferential direction angle area of the second magnetic flux concentration ring 52 positioned at the outer circumferential side is set to be relatively wide (the circumferential direction length L2 of the second cutting portion 52c is set to be relatively great), this problem of the unbalanced state can be avoided.

In the present embodiment, the first and second magnetic flux concentration rings 51, 52 are configured to be surrounded or enclosed with the second ring portion 44, and the both magnetic flux concentration rings 51, 52 are arranged only at the outer circumferential side of the first ring portion 43. Thus, as shown in FIG. 8, it is possible to reduce ill effects of an axial direction external magnetic field (an axial direction magnetic flux AF) that enters the first and second magnetic flux concentration rings 51, 52 from top end opening sides of the first and second ring portions 43, 44.

Here, if the first and second magnetic flux concentration rings 51, 52 are arranged at both inner and outer circumferential sides of the first ring portion 43, a member to magnetically connect the first and second magnetic flux concentration rings 51, 52 is required with this connecting member arranged across the first ring portion 43, and this connecting member is easily affected by the external magnetic field from the axial direction. However, as described above, by the fact that the first and second magnetic flux concentration rings 51, 52 are accommodated between the first and second ring portions 43, 44, this problem can be avoided.

Further, in the present embodiment, also regarding the window hole 11c through which the board-to-board connector 64 is drawn to the inside of the housing 10, the window hole 11c is arranged at the position where the window hole 11c does not interfere with the first and second yoke members 31, 32 and the first and second magnetic flux concentration rings 51, 52. This arrangement avoids a problem that the external magnetic field entering the housing 10 through the window hole 11c directly acts on the first and second magnetic flux concentration rings 51, 52.

FIGS. 9A to 9D show a second embodiment of the torque sensor etc. of the present invention. In the second embodiment, the configuration of the first and second yoke members 31, 32 of the first embodiment is changed.

That is, in the present embodiment, the first and second radial direction extending portions 41b, 42b of the first and second nail portions 41, 42 of the first and second yoke members 31, 32 are removed. Instead of this, first and second connecting portions 45, 46 are formed by the fact that an entire circumference of each base end portion of the first and second ring portions 43, 44 bends and extends in the radial direction of the rotation axis Z. More specifically, the first and second connecting portions 45, 46 are formed between the first and second nail portions 41, 42 (corresponding to the first and second axial direction extending portions 41a, 42a) and the first and second ring portions 43, 44 respectively of the first embodiment so as to extend in the radial direction and shield (cover or close) a bottom side of a magnetic flux concentration ring accommodating portion 50 that is formed between the first and second ring portions 43, 44. As can be seen in FIGS. 9A to 9D, the first and second connecting portions 45, 46 connects the first nail portion 41 and the first ring portion 43 and connects the second nail portion 42 and the second ring portion 44.

Except for the above components, the configurations are basically same as the first embodiment. Each component is indicated by the same reference sign in the drawings, and its explanation is omitted here.

In the present embodiment, as is clear from comparison between FIGS. 9A to 9D and FIGS. 10A to 10D, since the entering of the external magnetic field OF from the bottom side of the magnetic flux concentration ring accommodating portion 50 can be suppressed by the first and second connecting portions 45, 46, the ill effects of the external magnetic field OF on the torque detection can be suppressed more effectively.

Figure 11A:
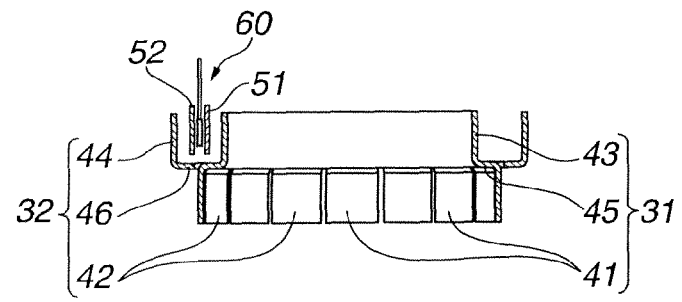
FIGS. 11A to 11C show a first modification of the second embodiment.
Figure 11B:
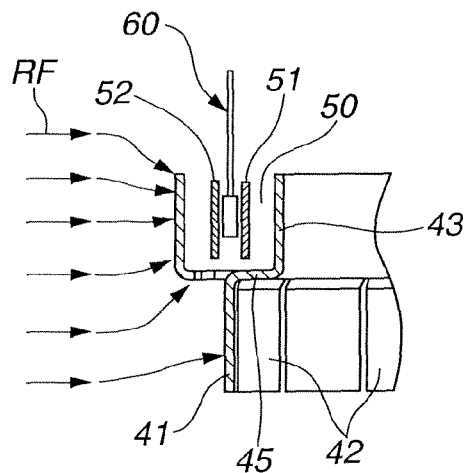
Figure 11C:
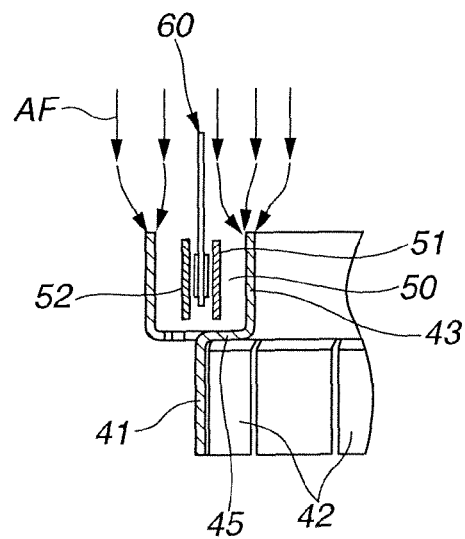

FIGS. 11A to 11C show a first modification of the second embodiment of the torque sensor etc. of the present invention. In the first modification, the first and second magnetic flux concentration rings 51, 52 are arranged so as to be completely accommodated in the magnetic flux concentration ring accommodating portion 50, and whole axial direction areas of the first and second magnetic flux concentration rings 51, 52 overlap with the second ring portion 44 (also with the first ring portion 43) in the axial direction when viewed from the radial direction (whole axial direction areas of the first and second magnetic flux concentration rings 51, 52 and the second ring portion 44 (also the first ring portion 43) are arranged in layers in the radial direction).

Figure 12A:
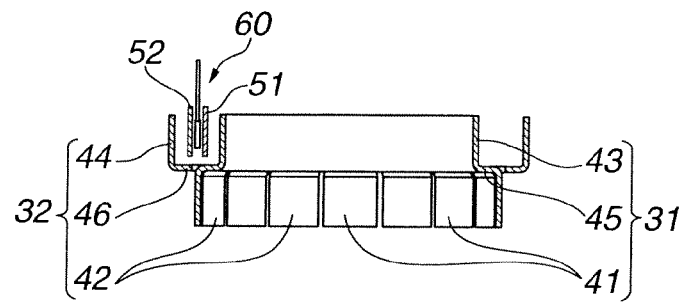
FIGS. 12A to 12C show a comparison example with the first modification of the second embodiment.
Figure 12B:
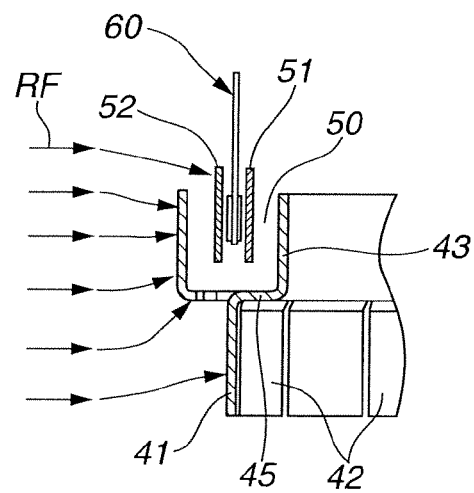
Figure 12C:
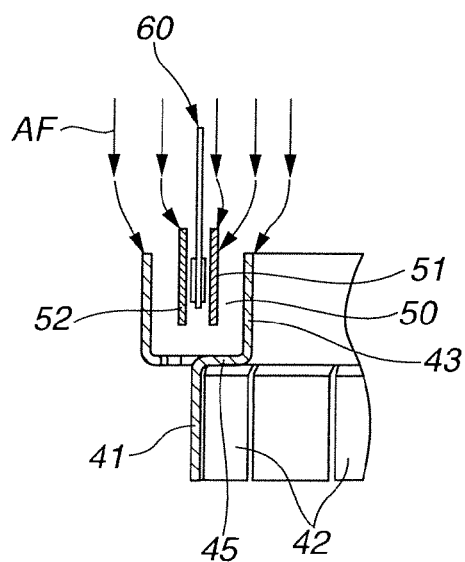

With this configuration, in comparison with the second embodiment shown in FIGS. 12A to 12C, by the first and second ring portions 43, 44 arranged at outermost sides in the axial and radial directions, the first and second magnetic flux concentration rings 51, 52 are unaffected by both of the axial direction magnetic flux AF and the radial direction magnetic flux RF of the external magnetic field OF. The ill effects of the external magnetic field OF on the torque detection can therefore be suppressed more effectively.

Figure 13A:
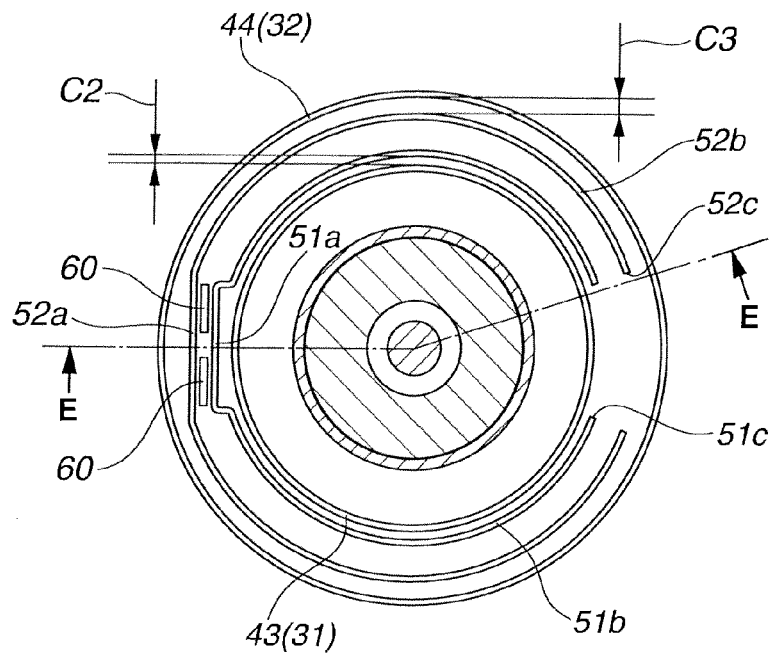
FIGS. 13A and 13B show a second modification of the second embodiment.
Figure 13B:
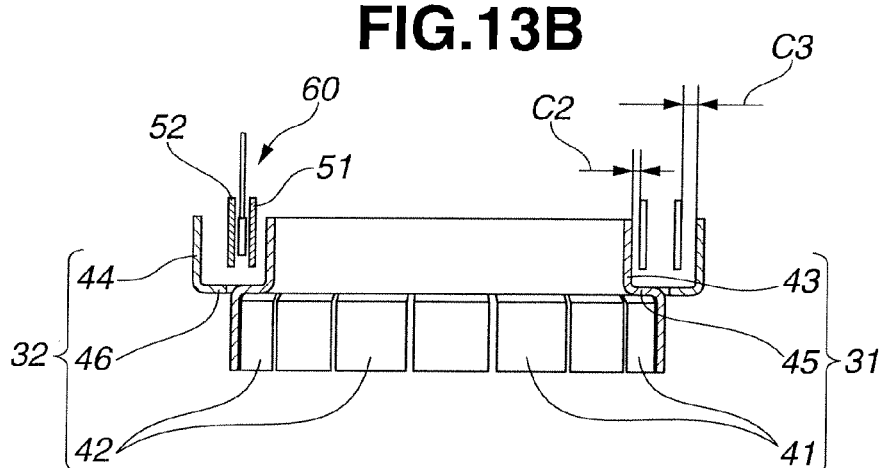

FIGS. 13A and 13B show a second modification of the second embodiment of the torque sensor etc. of the present invention. In the second modification, while both circumferential direction angle areas of the first and second magnetic flux concentration rings 51, 52 are set to be substantially equal to each other, the radial direction gap C3 between the second magnetic flux concentration ring 52 and the second ring portion 44 is set to be greater than the radial direction gap C2 between the first magnetic flux concentration ring 51 and the first ring portion 43 (i.e. C2<C3).

By the fact that the radial direction gap C3 between the second magnetic flux concentration ring 52 arranged at the outer circumferential side and the second ring portion 44 is set to be relatively great, both magnetic path resistances of the first and second magnetic flux concentration rings 51, 52 can be adjusted, then both magnetic path resistances of the first and second magnetic flux concentration rings 51, 52 are equalized.

Here, if both radial direction gaps C2, C3 are set to be equal to each other, an opposing area between the second magnetic flux concentration ring 52 and the second ring portion 44 becomes greater by an area equivalent to the circumferential direction length of the second magnetic flux concentration ring 52 which is longer than that of the first magnetic flux concentration ring 51 due to the fact that the second magnetic flux concentration ring 52 is positioned at the outer circumferential side. As a result, an efficiency of the magnetic flux concentration of the second magnetic flux concentration ring 52 is increased, and this results in an unbalanced state of the magnetic path resistances of the first and second magnetic flux concentration rings 51, 52. However, as described above, by the fact that the radial direction gap C3 at the outer circumferential side is set to be relatively great, the increase of the efficiency of the magnetic flux concentration is cancelled by the increased magnetic path resistance that results from the widened radial direction gap C3, then this problem is avoided.

Figure 14:
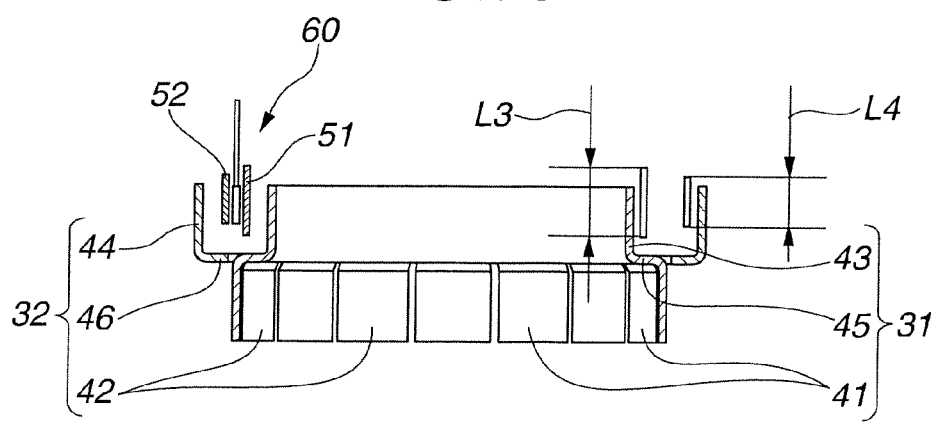
FIG. 14 is a longitudinal cross section of the torque sensor of a third modification of the second embodiment, corresponding to FIG. 9C.

FIG. 14 shows a third modification of the second embodiment of the torque sensor etc. of the present invention. In the third modification, while both circumferential direction angle areas of the first and second magnetic flux concentration rings 51, 52 are set to be substantially equal to each other, an axial direction length L4 of the second magnetic flux concentration ring 52 is set to be smaller (shorter) than an axial direction length L3 of the first magnetic flux concentration ring 51 (i.e. L4<L3).

By the fact that the axial direction length L4 of the second magnetic flux concentration ring 52 arranged at the outer circumferential side is set to be relatively small, an opposing area between the first magnetic flux concentration ring 51 and the first ring portion 43 and an opposing area between the second magnetic flux concentration ring 52 and the second ring portion 44 can be adjusted, then both efficiencies of the magnetic flux concentration of the first and second magnetic flux concentration rings 51, 52 are equalized.

Here, if both axial direction lengths L3, L4 are set to be equal to each other, the opposing area between the second magnetic flux concentration ring 52 and the second ring portion 44 becomes greater by an area equivalent to the circumferential direction length of the second magnetic flux concentration ring 52 which is longer than that of the first magnetic flux concentration ring 51 due to the fact that the second magnetic flux concentration ring 52 is positioned at the outer circumferential side. As a result, the efficiency of the magnetic flux concentration of the second magnetic flux concentration ring 52 is increased, and this results in an unbalanced state of the magnetic path resistances of the first and second magnetic flux concentration rings 51, 52. However, as described above, by the fact that the axial direction length L4 of the second magnetic flux concentration ring 52 arranged at the outer circumferential side is set to be relatively small, the increase of the efficiency of the magnetic flux concentration is cancelled by reduction of the opposing area between the second magnetic flux concentration ring 52 and the second ring portion 44 which results from the shortened axial direction length L4, then this problem is avoided.

The present invention is not limited to the above embodiments and modifications. Not only configurations or structures of, for instance, the housing 10 and the first and second rack-and-pinion gear mechanism RP1, RP2, with which the present invention is not directly concerned as a feature, but also configuration or structure of the magnetic member 20, the first and second yoke members 31, 32 and the first and second magnetic flux concentration rings 51, 52 (the first and second magnetic flux concentration members 54, 55), which are the features of the present invention, can be freely changed or modified according to specifications of the vehicle and the torque sensor.

For instance, in the above embodiments and modifications, the torque sensor TS is explained with the torque sensor TS applied to a so-called dual pinion type power steering system in which the steering system and the assist system are provided independently of each other. However, as the power steering system according to the present invention which employs the torque sensor TS, as long as the power steering system is the one that is controlled on the basis of the torque detection of the torque sensor TS such as a so-called single pinion type power steering system in which the second output shaft 6 is removed and the electric motor M is coupled with the first output shaft 3 via the speed reduction gear mechanism 5, the present invention can be applied to any power steering systems.

Further, in the above embodiments and modifications, with respect to the first and second yoke members 31, 32, the first nail portions 41 and the second nail portions 42 are concentrically arranged. However, this arrangement could be changed as long as the both nail portions 41, 42 are set concentrically with the rotation axis Z.

For instance, the first and second nail portions 41, 42 could be arranged so that an air gap between the first nail portion 41 and the permanent magnet 21 and an air gap between the second nail portion 42 and the permanent magnet 21 are different from each other. Or alternatively, the first and second nail portions 41, 42 might be arranged so that the first nail portions 41 are arranged at an inner circumferential side of the permanent magnet 21 and the second nail portions 42 are arranged at an outer circumferential side of the permanent magnet 21 while keeping the air gaps between the first nail portion 41 and the permanent magnet 21 and between the second nail portion 42 and the permanent magnet 21. By adjusting the arrangement (positions) of the first and second nail portions 41, 42 in this way, a difference of the magnetic path resistance between the both yoke members 31, 32, which arises due to the arrangement of the inner and outer circumferential sides, can be adjusted, then the torque detection accuracy by the torque sensor TS can be further improved.

The above embodiments and modifications can produce advantageous effects as described above. In addition to those, modified examples having substantially the same effects as the above embodiments will be explained below.

(a) In the torque sensor (TS), the second magnetic flux concentration ring (52) is set so that a radial direction space (C6) between the second magnetic flux concentration ring (52) and the second ring portion (44) at a second sensor facing area (52a) of the second magnetic flux concentration ring (52) where the second magnetic flux concentration ring (52) faces the magnetic sensor (60) in the radial direction is greater than a radial direction gap (C3) between the second magnetic flux concentration ring (52) and the second ring portion (44) at a circumferential direction outer side area (52b) of the second magnetic flux concentration ring (52) except the second sensor facing area (52a).

According to the torque sensor of (a), by setting the radial direction space (C6) between the second magnetic flux concentration ring (52) and the second ring portion (44) at the second sensor facing area (52a) to be relatively great, the external magnetic field transmitted through the second ring portion (44) bypasses the second sensor facing area (52a) and is transmitted to the circumferential direction outer side area (52b) where the radial direction gap (C3) is small (magnetic path resistance is small) as compared with the radial direction space (C6). The transmission route of the external magnetic field to the magnetic sensor (60) therefore extends. As a consequence, ill effects of the external magnetic field on the torque detection can be effectively reduced.

(b) In the torque sensor (TS), the first magnetic flux concentration ring (51) is configured so that a first sensor facing area (51a) of the first magnetic flux concentration ring (51) where the first magnetic flux concentration ring (51) faces the magnetic sensor (60) in the radial direction protrudes in a radially outward direction with respect to a circumferential direction outer side area (51b) of the first magnetic flux concentration ring (51) except the first sensor facing area (51a).

According to the torque sensor of (b), by the fact that the first sensor facing area (51a) is formed so as to protrude in the radially outward direction, the radial direction space (C4) between the first and second flat portions (51a, 52a) becomes narrow, and also the circumferential length (an entire length) of the first magnetic flux concentration ring (51), which tends to be shorter than that of the second magnetic flux concentration ring (52) due to the fact that the first magnetic flux concentration ring (51) is arranged at the inner circumferential side, elongates, thereby equalizing both magnetic path resistances of the first and second magnetic flux concentration rings (51, 52).

(c) In the torque sensor (TS), the first and second magnetic flux concentration rings (51, 52) are configured so that a circumferential direction angle area that surrounds the rotation axis (Z) by the second magnetic flux concentration ring (52) is smaller than a circumferential direction angle area that surrounds the rotation axis (Z) by the first magnetic flux concentration ring (51).

If the both circumferential direction angle areas of the first and second magnetic flux concentration rings (51, 52) are set to be equal to each other, an opposing area between the second magnetic flux concentration ring (52) and the second ring portion (44) becomes greater by an area equivalent to the circumferential direction length of the second magnetic flux concentration ring (52) which is longer than that of the first magnetic flux concentration ring (51) due to the fact that the second magnetic flux concentration ring (52) is positioned at the outer circumferential side. As a result, an efficiency of the magnetic flux concentration of the second magnetic flux concentration ring (52) is increased, and this results in an unbalanced state of the magnetic path resistances of the first and second magnetic flux concentration rings (51, 52).

However, according to the torque sensor of (c), both magnetic path resistances of the first and second magnetic flux concentration rings (51, 52) which are arranged in layers each other in the radial direction are equalized.

(d) In the torque sensor (TS), the first and second magnetic flux concentration rings (51, 52) are configured so that an axial direction length (L4) of the second magnetic flux concentration ring (52) is shorter than an axial direction length (L3) of the first magnetic flux concentration ring (51).

If both axial direction lengths (L3, L4) are set to be equal to each other, the opposing area between the second magnetic flux concentration ring (52) and the second ring portion (44) becomes greater by an area equivalent to the circumferential direction length of the second magnetic flux concentration ring (52) which is longer than that of the first magnetic flux concentration ring (51) due to the fact that the second magnetic flux concentration ring (52) is positioned at the outer circumferential side. As a result, the efficiency of the magnetic flux concentration of the second magnetic flux concentration ring (52) is increased, and this results in an unbalanced state of the magnetic path resistances of the first and second magnetic flux concentration rings (51, 52).

However, according to the torque sensor of (d), the increase of the efficiency of the magnetic flux concentration is cancelled by reduction of the opposing area between the second magnetic flux concentration ring (52) and the second ring portion (44) which results from the shortened axial direction length (L4), then both magnetic path resistances of the first and second magnetic flux concentration rings (51, 52) which are arranged in layers each other in the radial direction are equalized.

(e) In the torque sensor (TS), the first and second magnetic flux concentration rings (51, 52) are configured so that a radial direction gap (C3) between the second magnetic flux concentration ring (52) and the second ring portion (44) is greater than a radial direction gap (C2) between the first magnetic flux concentration ring (51) and the first ring portion (43).

If both radial direction gaps (C2, C3) are set to be equal to each other, an opposing area between the second magnetic flux concentration ring (52) and the second ring portion (44) becomes greater by an area equivalent to the circumferential direction length of the second magnetic flux concentration ring (52) which is longer than that of the first magnetic flux concentration ring (51) due to the fact that the second magnetic flux concentration ring (52) is positioned at the outer circumferential side. As a result, an efficiency of the magnetic flux concentration of the second magnetic flux concentration ring (52) is increased, and this results in an unbalanced state of the magnetic path resistances of the first and second magnetic flux concentration rings (51, 52).

However, according to the torque sensor of (e), the increase of the efficiency of the magnetic flux concentration is cancelled by the increased magnetic path resistance that results from the widened radial direction gap (C3), then both magnetic path resistances of the first and second magnetic flux concentration rings (51, 52) which are arranged in layers each other in the radial direction are equalized.

(f) In the torque sensor (TS), the second ring portion (44) is configured so that whole axial direction areas of the first and second magnetic flux concentration rings (51, 52) overlap with the second ring portion (44) in an axial direction when viewed from the radial direction.

According to the torque sensor of (f), ill effects of the external magnetic field on the first and second magnetic flux concentration rings (51, 52) can therefore be suppressed more effectively.

(g) In the torque sensor (TS), the first magnetic flux concentration ring (51) is configured to surround the rotation axis (Z) in a circumferential direction angle area over 180 degrees.

According to the torque sensor of (g), even in a case where each position of the first and second magnetic flux concentration rings (51, 52) shifts in the radial direction, a detection error of the magnetic sensor (60) due to the position shift of the first and second magnetic flux concentration rings (51, 52) can be suppressed.

(h) In the torque sensor (TS), the torque sensor (TS) further has a housing (10) that is formed by non-magnetic material; and a harness that is drawn to an inside of the housing (10) through a window hole (11c) formed to penetrate the housing (10) and transports a detection signal of the magnetic sensor (60) to an external device. And the window hole (11c) is located at an offset position in an axial direction with respect to the first and second magnetic flux concentration rings (51, 52).

According to the torque sensor of (h), it is possible to avoid a problem that the external magnetic field entering the housing (10) through the window hole (11c) directly acts on the first and second magnetic flux concentration rings (51, 52).

(i) In the torque sensor (TS), the first and second magnetic flux concentration rings (51, 52) are formed by press molding.

According to the torque sensor of (i), since a curving (bending) direction of the press molding is only a direction along the rotation axis (Z), the first and second magnetic flux concentration rings (51, 52) are easily formed.

(j) In the power steering system, the first magnetic flux concentration ring (51) is arranged only at an outer circumferential side of the first ring portion (43) of the first yoke member (31).

If the first and second magnetic flux concentration rings (51, 52) are arranged at both inner and outer circumferential sides of the first ring portion (43), a member to magnetically connect the first and second magnetic flux concentration rings (51, 52) is required with this connecting member arranged across the first ring portion (43), and this connecting member is easily affected by the external magnetic field from the axial direction.

However, according to the power steering system of (j), it is possible to reduce the influence of the external magnetic field from the axial direction.

(k) In the power steering system, the second ring portion (44) is formed so that a diameter of the second ring portion (44) is greater than a diameter of a virtual circle that is formed by connecting the second nail portions (42), and a second connecting portion (46) that connects the second ring portion (44) and each second nail portion (42) is formed so as to extend from each base end portion of the second nail portions (42) to a radially outward direction.

According to the power steering system of (k), by the second connecting portion (46), it is possible to reduce the influence of the external magnetic field that enters the magnetic flux concentration ring accommodating portion (50) from an axial direction outer side.

(l) In the power steering system, the second magnetic flux concentration ring (52) is set so that a radial direction space (C6) between the second magnetic flux concentration ring (52) and the second ring portion (44) at a second sensor facing area (52a) of the second magnetic flux concentration ring (52) where the second magnetic flux concentration ring (52) faces the magnetic sensor (60) in the radial direction is greater than a radial direction gap (C3) between the second magnetic flux concentration ring (52) and the second ring portion (44) at a circumferential direction outer side area (52b) of the second magnetic flux concentration ring (52) except the second sensor facing area (52a).

According to the power steering system of (l), by setting the radial direction space (C6) between the second magnetic flux concentration ring (52) and the second ring portion (44) at the second sensor facing area (52a) to be relatively great, the external magnetic field transmitted through the second ring portion (44) bypasses the second sensor facing area (52a) and is transmitted to the circumferential direction outer side area (52b) where the radial direction gap (C3) is small (magnetic path resistance is small) as compared with the radial direction space (C6). The transmission route of the external magnetic field to the magnetic sensor (60) therefore extends. As a consequence, ill effects of the external magnetic field on the torque detection can be effectively reduced.

(m) In the power steering system, the first magnetic flux concentration ring (51) is configured so that a first sensor facing area (51a) of the first magnetic flux concentration ring (51) where the first magnetic flux concentration ring (51) faces the magnetic sensor (60) in the radial direction protrudes in a radially outward direction with respect to a circumferential direction outer side area (51b) of the first magnetic flux concentration ring (51) except the first sensor facing area (51a).

According to the power steering system of (m), by the fact that the first sensor facing area (51a) is formed so as to protrude in the radially outward direction, the radial direction space (C4) between the first and second flat portions (51a, 52a) becomes narrow, and also the circumferential length (an entire length) of the first magnetic flux concentration ring (51), which tends to be shorter than that of the second magnetic flux concentration ring (52) due to the fact that the first magnetic flux concentration ring (51) is arranged at the inner circumferential side, elongates, thereby equalizing both magnetic path resistances of the first and second magnetic flux concentration rings (51, 52).

(n) In the power steering system, the first and second magnetic flux concentration rings (51, 52) are configured so that a circumferential direction angle area that surrounds the rotation axis (Z) by the second magnetic flux concentration ring (52) is smaller than a circumferential direction angle area that surrounds the rotation axis (Z) by the first magnetic flux concentration ring (51).

If the both circumferential direction angle areas of the first and second magnetic flux concentration rings (51, 52) are set to be equal to each other, an opposing area between the second magnetic flux concentration ring (52) and the second ring portion (44) becomes greater by an area equivalent to the circumferential direction length of the second magnetic flux concentration ring (52) which is longer than that of the first magnetic flux concentration ring (51) due to the fact that the second magnetic flux concentration ring (52) is positioned at the outer circumferential side. As a result, an efficiency of the magnetic flux concentration of the second magnetic flux concentration ring (52) is increased, and this results in an unbalanced state of the magnetic path resistances of the first and second magnetic flux concentration rings (51, 52). However, according to the torque sensor of (n), both magnetic path resistances of the first and second magnetic flux concentration rings (51, 52) which are arranged in layers each other in the radial direction are equalized.

(o) In the power steering system, the first and second magnetic flux concentration rings (51, 52) are configured so that an axial direction length (L4) of the second magnetic flux concentration ring (52) is shorter than an axial direction length (L3) of the first magnetic flux concentration ring (51).

If both axial direction lengths (L3, L4) are set to be equal to each other, the opposing area between the second magnetic flux concentration ring (52) and the second ring portion (44) becomes greater by an area equivalent to the circumferential direction length of the second magnetic flux concentration ring (52) which is longer than that of the first magnetic flux concentration ring (51) due to the fact that the second magnetic flux concentration ring (52) is positioned at the outer circumferential side. As a result, the efficiency of the magnetic flux concentration of the second magnetic flux concentration ring (52) is increased, and this results in an unbalanced state of the magnetic path resistances of the first and second magnetic flux concentration rings (51, 52).

However, according to the torque sensor of (o), the increase of the efficiency of the magnetic flux concentration is cancelled by reduction of the opposing area between the second magnetic flux concentration ring (52) and the second ring portion (44) which results from the shortened axial direction length (L4), then both magnetic path resistances of the first and second magnetic flux concentration rings (51, 52) which are arranged in layers each other in the radial direction are equalized.

(p) In the power steering system, the first and second magnetic flux concentration rings (51, 52) are configured so that a radial direction gap (C3) between the second magnetic flux concentration ring (52) and the second ring portion (44) is greater than a radial direction gap (C2) between the first magnetic flux concentration ring (51) and the first ring portion (43).

If both radial direction gaps (C2, C3) are set to be equal to each other, an opposing area between the second magnetic flux concentration ring (52) and the second ring portion (44) becomes greater by an area equivalent to the circumferential direction length of the second magnetic flux concentration ring (52) which is longer than that of the first magnetic flux concentration ring (51) due to the fact that the second magnetic flux concentration ring (52) is positioned at the outer circumferential side. As a result, an efficiency of the magnetic flux concentration of the second magnetic flux concentration ring (52) is increased, and this results in an unbalanced state of the magnetic path resistances of the first and second magnetic flux concentration rings (51, 52).

However, according to the torque sensor of (p), the increase of the efficiency of the magnetic flux concentration is cancelled by the increased magnetic path resistance that results from the widened radial direction gap (C3), then both magnetic path resistances of the first and second magnetic flux concentration rings (51, 52) which are arranged in layers each other in the radial direction are equalized.

The entire contents of Japanese Patent Application No. 2012-202208 filed on Sep. 14, 2012 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A torque sensor detecting a torque generated in a rotation member that is formed by a First shaft member and a second shaft member both of which are connected through a torsion bar, the torque sensor comprising:
  a magnetic member provided at the first shaft member so as to rotate integrally with the first shaft member and having different magnetic poles that are alternately arranged in a circumferential direction concentrically with a rotation axis of the rotation member;
  a first yoke member formed by magnetic material and provided at the second shaft member so as to rotate integrally with the second shaft member, the first yoke member having;
  (a) a plurality of first nail portions that are arranged concentrically with the rotation axis so as to face the magnetic member in a radial direction of the rotation axis; and
  (b) a first ring portion that connects the first nail portions together,
  a second yoke member formed by magnetic material and provided at the second shaft member so as to rotate integrally with the second shaft member the second yoke member having;
  (c) a plurality of second nail portions that are arranged concentrically with the rotation axis in such a way that the first nail portions and the second nail portions are alternately arranged in the circumferential direction and the second nail portions face the magnetic member in the radial direction of the rotation axis; and
  (d) a second ring portion that is arranged at an outer circumferential side of the first ring portion so as to be separated from and face the first ring portion and connects the second nail portions together,
  a first magnetic flux concentration ring formed by magnetic material and having a substantially arc-shape in a horizontally-cut cross section, the first magnetic flux concentration ring provided between the first ring portion and the second ring portion so that the first magnetic flux concentration ring and the first ring portion are arranged in layers each other in the radial direction and generating thereinside magnetic field by magnetic field generated in the first ring portion;
  a second magnetic flux concentration ring formed by magnetic material and having a substantially arc-shape in a horizontally-cut cross section, the second magnetic flux concentration ring provided between the second ring portion and the first magnetic flux concentration ring so that the second magnetic flux concentration ring and the second ring portion are arranged in layers each other in the radial direction and generating thereinside magnetic field by magnetic field generated in the second ring portion; and
  a magnetic sensor arranged between the first and second magnetic flux concentration rings and having a Hall device that detects a change of internal magnetic field between the first and second magnetic flux concentration rings which occurs by receiving the magnetic field between the first and second ring portions which changes according to a change of a relative angle between the first and second nail portions and the magnetic member in response to torsion deformation of the torsion bar, and
  the torque generated in the rotation member being detected on the basis of an output signal of the magnetic sensor.

2. The torque sensor as claimed in claim 1, wherein:
the first magnetic flux concentration ring is arranged only at an outer circumferential side of the first ring portion of the first yoke member.

3. The torque sensor as claimed in claim 1, wherein:
the second ring portion is formed so that a diameter of the second ring portion is greater than a diameter of a virtual circle that is formed by connecting the second nail portions, and
a second connecting portion that connects the second ring portion and each second nail portion is formed so as to extend from each base end portion of the second nail portions to a radially outward direction.

4. The torque sensor as claimed in claim 1, wherein:
the second magnetic flux concentration ring is set so that a radial direction space between the second magnetic flux concentration ring and the second ring portion at a second sensor facing area of the second magnetic flux concentration ring where the second magnetic flux concentration ring faces the magnetic sensor in the radial direction is greater than a radial direction gap between the second magnetic flux concentration ring and the second ring portion at a circumferential direction outer side area of the second magnetic flux concentration ring except the second sensor facing area.

5. The torque sensor as claimed in claim 4, wherein:
the first magnetic flux concentration ring is configured so that a first sensor facing area of the first magnetic flux concentration ring where the first magnetic flux concentration ring faces the magnetic sensor in the radial direction protrudes in a radially outward direction with respect to a circumferential direction outer side area of the first magnetic flux concentration ring except the first sensor facing area.

6. The torque sensor as claimed in claim 1, wherein:
the first and second magnetic flux concentration rings are configured so that a circumferential direction angle area that surrounds the rotation axis by the second magnetic flux concentration ring is smaller than a circumferential direction angle area that surrounds the rotation axis by the first magnetic flux concentration ring.

7. The torque sensor as claimed in claim 1, wherein:
the first and second magnetic flux concentration rings are configured so that an axial direction length of the second magnetic flux concentration ring is shorter than an axial direction length of the first magnetic flux concentration ring.

8. The torque sensor as claimed in claim 1, wherein:
the first and second magnetic flux concentration rings are configured so that a radial direction gap between the second magnetic flux concentration ring and the second ring portion is greater than a radial direction gap between the first magnetic flux concentration ring and the first ring portion.

9. The torque sensor as claimed in claim 1, wherein:
the second ring portion is configured so that whole axial direction areas of the first and second magnetic flux concentration rings overlap with the second ring portion in an axial direction when viewed from the radial direction.

10. The torque sensor as claimed in claim 1, wherein:
the first magnetic flux concentration ring is configured to surround the rotation axis in a circumferential direction angle area over 180 degrees.

11. The torque sensor as claimed in claim 1, further comprising:
a housing that is formed by non-magnetic material; and
a harness that is drawn to an inside of the housing through a window hole formed to penetrate the housing and transports a detection signal of the magnetic sensor to an external device, and wherein
the window hole is located at an offset position in an axial direction with respect to the first and second magnetic flux concentration rings.

12. The torque sensor as claimed in claim 1, wherein:
the first and second magnetic flux concentration rings are formed by press molding.

13. A power steering system comprising:
a steering mechanism having;
a steering shaft formed by an input shaft which rotates according to a steering operation of a steering wheel and an output shaft to which a rotation of the input shaft is transmitted by being connected to the input shaft through a torsion bar; and
a conversion mechanism which converts a rotation of the output shaft to a steering motion of steered road wheels,
a torque sensor that detects a steering torque generated in the steering shaft; and
an electric motor that provides a steering force to the steering mechanism on the basis of an output signal of the torque sensor, and
the torque sensor having;
a magnetic member provided at the first shaft member so as to rotate integrally with the first shaft member and having different magnetic poles that are alternately arranged in a circumferential direction concentrically with a rotation axis of the rotation member;
a first yoke member formed by magnetic material and provided at the second shaft member so as to rotate integrally with the second shaft member, the first yoke member having;
(a) a plurality of first nail portions that are arranged concentrically with the rotation axis so as to face the magnetic member in a radial direction of the rotation axis; and
(b) a first ring portion that connects the first nail portions together,
a second yoke member formed by magnetic material and provided at the second shaft member so as to rotate integrally with the second shaft member, the second yoke member having;
(c) a plurality of second nail portions that are arranged concentrically with the rotation axis in such a way that the first nail portions and the second nail portions are alternately arranged in the circumferential direction and the second nail portions face the magnetic member in the radial direction of the rotation axis; and
(d) a second ring portion that is arranged at an outer circumferential side of the first ring portion so as to be separated from and face the first ring portion and connects the second nail portions together,
a first magnetic flux concentration ring formed by magnetic material and having a substantially arc-shape in a horizontally-cut cross section, the first magnetic flux concentration ring provided between the first ring portion and the second ring portion so that the first magnetic flux concentration ring and the first ring portion are arranged in layers each other in the radial direction and generating thereinside magnetic field by magnetic field generated in the first ring portion;
a second magnetic flux concentration ring formed by magnetic material and having a substantially arc-shape in a horizontally-cut cross section, the second magnetic flux concentration ring provided between the second ring portion and the first magnetic flux concentration ring so that the second magnetic flux concentration ring and the second ring portion are arranged in layers each other in the radial direction and generating thereinside magnetic field by magnetic field generated in the second ring portion; and
a magnetic sensor arranged between the first and second magnetic flux concentration rings and having a Hall device that detects a change of internal magnetic field between the first and second magnetic flux concentration rings which occurs by receiving the magnetic field between the first and second ring portions which changes according to a change of a relative angle between the first and second nail portions and the magnetic member in response to torsion deformation of the torsion bar.

14. The power steering system as claimed in claim 13, wherein:
the first magnetic flux concentration ring is arranged only at an outer circumferential side of the first ring portion of the first yoke member.

15. The power steering system as claimed in claim 13, wherein:
the second ring portion is formed so that a diameter of the second ring portion is greater than a diameter of a virtual circle that is formed by connecting the second nail portions, and
a second connecting portion that connects the second ring portion and each second nail portion is formed so as to extend from each base end portion of the second nail portions to a radially outward direction.

16. The power steering system as claimed in claim 13, wherein:
the second magnetic flux concentration ring is set so that a radial direction space between the second magnetic flux concentration ring and the second ring portion at a second sensor facing area of the second magnetic flux concentration ring where the second magnetic flux concentration ring faces the magnetic sensor in the radial direction is greater than a radial direction gap between the second magnetic flux concentration ring and the second ring portion at a circumferential direction outer side area of the second magnetic flux concentration ring except the second sensor facing area.

17. The power steering system as claimed in claim 16, wherein:
the first magnetic flux concentration ring is configured so that a first sensor facing area of the first magnetic flux concentration ring where the first magnetic flux concentration ring faces the magnetic sensor in the radial direction protrudes in a radially outward direction with respect to a circumferential direction outer side area of the first magnetic flux concentration ring except the first sensor facing area.

18. The power steering system as claimed in claim 13, wherein:

the first and second magnetic flux concentration rings are configured so that a circumferential direction angle area that surrounds the rotation axis by the second magnetic flux concentration ring is smaller than a circumferential direction angle area that surrounds the rotation axis by the first magnetic flux concentration ring.

19. The power steering system as claimed in claim 13, wherein:
the first and second magnetic flux concentration rings are configured so that an axial direction length of the second magnetic flux concentration ring is shorter than an axial direction length of the first magnetic flux concentration ring.

20. The power steering system as claimed in claim 13, wherein: the first and second magnetic flux concentration rings are configured so that a radial direction gap between the second magnetic flux concentration ring and the second ring portion is greater than a radial direction gap between the first magnetic flux concentration ring and the first ring portion.

* * * * *